US012148346B2

(12) United States Patent
Wang et al.

(10) Patent No.: US 12,148,346 B2

(45) Date of Patent: Nov. 19, 2024

(54) PIXEL CIRCUIT WITH COMPENSATION CIRCUIT, DISPLAY PANEL AND DISPLAY APPARATUS

(71) Applicant: BOE Technology Group Co., Ltd., Beijing (CN)

(72) Inventors: Li Wang, Beijing (CN); Xinshe Yin, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/452,795

(22) Filed: Aug. 21, 2023

(65) Prior Publication Data

US 2023/0401990 A1 Dec. 14, 2023

Related U.S. Application Data

(63) Continuation of application No. 17/433,068, filed as application No. PCT/CN2020/123332 on Oct. 23, 2020, now Pat. No. 11,776,449.

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2300/0408* (2013.01);
(Continued)

(58) Field of Classification Search
CPC ......... G09G 3/2007; G09G 3/32–3291; G09G 2300/0408; G09G 2300/0426;
(Continued)

(56) References Cited

U.S. PATENT DOCUMENTS 8,289,234 B2 * 10/2012 Kim ..................... G09G 3/3291 345/204
2005/0024352 A1 2/2005 Sano
(Continued)

FOREIGN PATENT DOCUMENTS

CN 1933688 A 3/2007
CN 104576686 A 4/2015
(Continued)

OTHER PUBLICATIONS

Notice of Allowance for corresponding U.S. Appl. No. 17/433,068 issued on May 24, 2023.
(Continued)

*Primary Examiner* — Nathan Danielsen
(74) *Attorney, Agent, or Firm* — ArentFox Schiff LLP; Michael Fainberg

(57) ABSTRACT

The present disclosure provides a pixel circuit, a display panel and a display apparatus. A gate of a data writing transistor is electrically connected with a first scan line, a first electrode of the data writing transistor is electrically connected with a data line, and a second electrode of the data writing transistor is electrically connected with a first electrode of a drive transistor; a compensation circuit is electrically connected with the gate of the drive transistor; and a light emitting control circuit is electrically connected with a first power signal line, the first electrode and the second electrode of the drive transistor, and a first electrode of a light emitting device, respectively; an orthographic projection of the compensation circuit on a base substrate partially overlaps with an orthographic projection of the first power signal line on the base substrate.

20 Claims, 21 Drawing Sheets

(52) U.S. Cl.
CPC ............... *G09G 2300/0819* (2013.01); *G09G 2310/0286* (2013.01); *G09G 2320/066* (2013.01)

(58) Field of Classification Search
CPC ... G09G 2300/0809; G09G 2300/0819; G09G 2300/0842; G09G 2300/0861; G09G 2300/0871; G09G 2310/0243; G09G 2310/0251; G09G 2310/0286; G09G 2310/06; G09G 2310/08; G09G 2320/0233; G09G 2320/0238; G09G 2320/0242; G09G 2320/04; G09G 2320/066
See application file for complete search history.

(56) References Cited

U.S. PATENT DOCUMENTS

| | | | |
|---|---|---|---|
| 2007/0118781 | A1 | 5/2007 | Kim |
| 2009/0284519 | A1 | 9/2009 | Kim et al. |
| 2013/0201172 | A1 | 8/2013 | Jeong et al. |
| 2015/0108437 | A1 | 4/2015 | Cho et al. |
| 2016/0079331 | A1 | 3/2016 | Hwang |
| 2016/0232840 | A1 | 8/2016 | Tseng et al. |
| 2019/0206316 | A1 | 7/2019 | Park et al. |
| 2019/0288048 | A1 | 9/2019 | Kang et al. |
| 2019/0362673 | A1 | 11/2019 | Ueda |
| 2021/0183308 | A1 | 6/2021 | Xuan |
| 2021/0398482 | A1 | 12/2021 | Wang et al. |

FOREIGN PATENT DOCUMENTS

| | | | |
|---|---|---|---|
| CN | 108777132 | A | 11/2018 |
| CN | 109308872 | A | 2/2019 |
| CN | 110111742 | A | 8/2019 |
| CN | 110136650 | A | 8/2019 |
| CN | 111179859 | A | 5/2020 |
| CN | 111724733 | A | 9/2020 |
| CN | 111754939 | A | 10/2020 |
| CN | 111754941 | A | 10/2020 |

OTHER PUBLICATIONS

NonFinal Office Action for U.S. Appl. No. 17/433,068 issued on Jan. 5, 2023.

* cited by examiner

PIXEL CIRCUIT WITH COMPENSATION CIRCUIT, DISPLAY PANEL AND DISPLAY APPARATUS

This application is a continuation application of U.S. Patent Application No. U.S. Ser. No. 17/433,068, filed on Aug. 23, 2021, which is a National Stage of International Application No. PCT/CN2020/123332, filed on Oct. 23, 2020, and entitled 'PIXEL CIRCUIT, DISPLAY PANEL AND DISPLAY APPARATUS', the entire contents of which are incorporated herein by reference.

FIELD

The present disclosure relates to the technical field of display, in particular to a pixel circuit, a display panel and a display apparatus.

BACKGROUND

An organic light emitting diode (OLED), a quantum dot light emitting diode (QLED), a micro light emitting diode (micro LED) and other electroluminescent diodes have the advantages of self-luminescence, low energy consumption, etc., and are one of the hotspots in the field of display apparatus application research nowadays. Pixel circuits are commonly used to drive electroluminescent diodes to emit light. In practical applications, when a display apparatus is to display any gray scale within the gray scale range, the data voltage may be made to exceed the output range of a driver integrated circuit (IC), resulting in the problem that the dark state is not sufficiently dark, which affects the contrast of the display apparatus.

SUMMARY

An embodiment of the present disclosure provides a pixel circuit, including:

- a data writing transistor, where a gate of the data writing transistor is electrically connected with a first scan line, a first electrode of the data writing transistor is electrically connected with a data line, a second electrode of the data writing transistor is electrically connected with a first electrode of a drive transistor; where a material of an active layer of the data writing transistor is a low temperature poly-silicon material;
- a compensation circuit, electrically connected with the gate of the drive transistor; and
- a light emitting control circuit, electrically connected with a first power signal line, the first electrode and the second electrode of the drive transistor and a first electrode of a light emitting device, and configured to turn on the first power signal line and the first electrode of the drive transistor and turn on the second electrode of the drive transistor and the first electrode of the light emitting device under control of a signal of a light emitting control line to drive the light emitting device to emit light;
- where an orthographic projection of the compensation circuit on a base substrate partially overlaps with an orthographic projection of the first power signal line on the base substrate.

In some embodiments, the compensation circuit includes: a first electrode and a second electrode;

- the first electrode of the compensation circuit is multiplexed with a compensation conductive part, and the second electrode of the compensation circuit is multiplexed with the first scan line;
- the compensation conductive part is arranged on a side of the first scan line facing away from the base substrate, and the compensation conductive part is insulated from the first scanning line; and
- an orthographic projection of the first scan line on a base substrate partially overlaps with an orthographic projection of the compensation conductive part on the base substrate.

In some embodiments, the orthographic projection of the first scan line on a base substrate covers the orthographic projection of the compensation conductive part on the base substrate.

In some embodiments, the light emitting control circuit includes a storage capacitor;

- the compensation conductive part is arranged on a same conductive layer as a first electrode of the storage capacitor.

In some embodiments, the pixel circuit further includes a first connection part, arranged on a side of the compensation conductive part facing away from the base substrate; and

- at least one interlayer dielectric layer, arranged between the first connection part and the compensation conductive part.

In some embodiments, the orthographic projection of the compensation conductive part on the base substrate does not overlap with an orthographic projection of the gate of the drive transistor on the base substrate; and

- the first connection part connects the compensation conductive part and the gate of the driving transistor through at least two via holes that run through the interlayer dielectric layer.

In some embodiments, the pixel circuit further includes a threshold compensation transistor;

- where an active layer of the threshold compensation transistor is arranged between the first connection part and a layer where the compensation conductive part is located;
- at least one interlayer dielectric layer is arranged between the active layer of the threshold compensation transistor and the first connection part;
- at least one interlayer dielectric layer is arranged between the active layer of the threshold compensation transistor and the layer where the compensation conductive part is located;
- an orthographic projection of the active layer of the threshold compensation transistor on the base substrate does not overlap with an orthographic projection of the compensation conductive part on the base substrate; and
- the first connection part is connected with the compensation conductive part and the conductive region of the active layer of the threshold compensation transistor through at least two via holes that run through the interlayer dielectric layer.

In some embodiments, the first power signal line is arranged on a side of the first connection part facing away the base substrate;

- an interlayer insulating layer is arranged between the first power signal line and the first connection part; and
- the first power signal line and the data line are arranged on a same layer.

In some embodiments, an orthographic projection of the first power signal line on the base substrate covers an orthographic projection of an active layer of a metal oxide transistor in the pixel circuit on the base substrate.

In some embodiments, a shape of an orthographic projection of the first power signal line on the base substrate is approximately R shape.

An embodiment of the present disclosure provides a display panel, including:

- a base substrate, including a plurality of sub-pixels, where each of the plurality of sub-pixels include a pixel circuit, and the pixel circuit includes a first compensation capacitor, a drive transistor and a light emitting control circuit;
- a first conductive layer, arranged on the base substrate, and including a first scan line and a gate of the drive transistor; where one row of sub-pixels corresponds to one first scan line;
- a first interlayer dielectric layer, arranged on a side of the first conductive layer facing away from the base substrate; and
- a second conductive layer, arranged on a side of the first interlayer dielectric layer facing away from the base substrate; where the second conductive layer includes compensation conductive parts; where the plurality of sub-pixels include the compensation conductive parts; for a same sub-pixel, a compensation conductive part is electrically connected with the gate of the drive transistor;
- an interlayer insulating layer, arranged on a side of the second conductive layer facing away from the base substrate, and
- a fifth conductive layer, arranged on a side of the interlayer insulating layer facing away from the base substrate, where the fifth conductive layer comprises a first power signal line, the first power signal line is connected with the light emitting control circuit;
- where an orthographic projection of the first compensation capacitor partially overlaps with an orthographic projection of the first power signal line on the base substrate.

In some embodiments, the pixel circuit further includes: a first reset transistor and a threshold compensation transistor;

- where the display panel further includes: a second interlayer dielectric layer, arranged on a side of the second conductive layer facing away from the base substrate; and
- an oxide semiconductor layer, arranged on a side of the second interlayer dielectric layer facing away from the base substrate;
- the oxide semiconductor layer includes an active layer of the first reset transistor and an active layer of the threshold compensation transistor.

In some embodiments, for a same sub-pixel, the active layer of the first reset transistor and the active layer of the threshold compensation transistor are integrated in a structure.

In some embodiments, an extension direction of a channel region of the active layer of the first reset transistor is roughly the same as an extension direction of a channel region of the active layer of the threshold compensation transistor.

In some embodiments, for a same sub-pixel, an orthographic projection of a channel region of the threshold compensation transistor on the base substrate is closer to an orthographic projection of a channel region of the drive transistor on the base substrate than an orthographic projection of a channel region of the first reset transistor on the base substrate.

In some embodiments, the orthographic projection of the first power signal line on the base substrate covers an orthographic projection of the oxide semiconductor layer on the base substrate.

In some embodiments, the display panel further includes:

- a second gate insulating layer, arranged on a side of the oxide semiconductor layer facing away from the base substrate; and
- a third conductive layer, arranged on a side of the second gate insulating layer facing away from the base substrate;
- where the third conductive layer includes a first reset line, and the first reset line is connected with a gate of the first reset transistor;
- the second conductive layer further includes: an auxiliary reset line;
- for the first reset transistor and the auxiliary reset line corresponding to a same sub-pixel, an orthographic projection of the auxiliary reset line on the base substrate and an orthographic projection of an active layer of the first reset transistor on the base substrate have an overlapping region;
- for the first reset transistor and the first reset line corresponding to a same sub-pixel, an orthographic projection of the first reset line on the base substrate and an orthographic projection of a channel region of the active layer of the first reset transistor on the base substrate have an overlapping region.

In some embodiments, the auxiliary reset line and the first reset line are electrically connected on an edge of a display area of the display panel.

In some embodiments, the third conductive layer further includes a second scan line, and the second scan line is electrically connected with a gate of the threshold compensation transistor;

- for the first scan line, the second scan line, and the first reset line corresponding to a same sub-pixel, an orthographic projection of the first scan line on the base substrate is arranged between an orthographic projections of the second scan line on the base substrate and an orthographic projection of the first reset line on the base substrate.

An embodiment of the present disclosure provides a display apparatus, including the display panel.

DETAILED DESCRIPTION OF THE EMBODIMENTS

Figure 1:
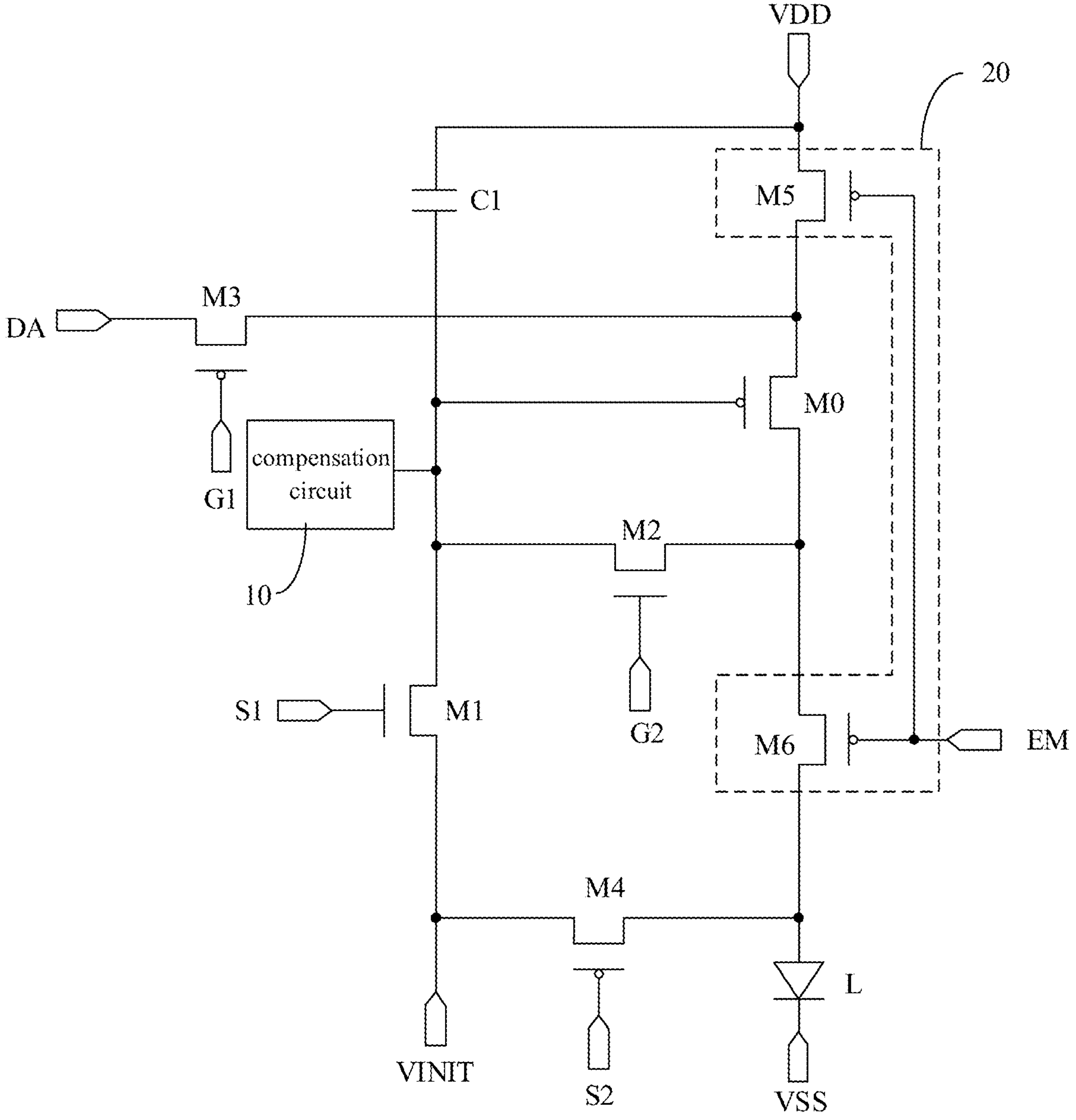
FIG. 1 is a schematic structural diagram of some pixel circuits in an embodiment of the present disclosure.

In order to make the objectives, technical solutions, and advantages of the embodiments of the present disclosure clearer, the technical solutions in embodiments of the present disclosure will be clearly and fully described in combination with the accompanying drawings of the embodiments of the present disclosure. It is apparent that the described embodiments are some, but not all, embodiments of the present disclosure. Also, embodiments and features in the embodiments of the disclosure may be combined with one another without conflict. Based on the described embodiments of the present disclosure, all other embodiments attainable by one of ordinary skilled in the art without involving any inventive effort are within the scope of the present disclosure.

Unless otherwise defined, the technical terms or scientific terms used in the present disclosure shall have the usual meanings understood by those with ordinary skills in the field to which the present disclosure belongs. "First", "second" and similar words used in the present disclosure do not indicate any order, quantity or importance, but are only used to distinguish different components. "Comprise" or "include" or other similar words mean that the element or item appearing before the word covers elements or items listed after the word and their equivalents, but does not exclude other elements or items. "Connecting" or "connected" or other similar words are not limited to physical or mechanical connections, but may include electrical connections, whether direct or indirect.

It should be noted that the dimensions and shapes of the various figures in the drawings are not to scale and are intended to be merely illustrative of the present disclosure. The same or similar reference numerals refer to the same or similar elements or elements having the same or similar functions throughout.

An embodiment of the present disclosure provides a pixel circuit, and as shown in FIG. 1, the pixel circuit may include:

- a data writing transistor M3, where a gate of the data writing transistor M3 is electrically connected with a first scan line G1, a first electrode of the data writing transistor M3 is electrically connected with a data line DA, and a second electrode of the data writing transistor M3 is electrically connected with a first electrode of a drive transistor M0; where a material of an active layer of the data writing transistor M3 is a low temperature poly-silicon material;
- a threshold compensation transistor M2, where a gate of the threshold compensation transistor M2 is electrically connected with a second scan line G2, a first electrode of the threshold compensation transistor M2 is electrically connected with a gate of the drive transistor M0, and a second electrode of the threshold compensation transistor M2 is electrically connected with a second electrode of the drive transistor M0; where a material of an active layer of the threshold compensation transistor M2 is a metal oxide semiconductor material;
- a compensation circuit 10, electrically connected with the gate of the drive transistor M0, and configured to compensate for a voltage of the gate of the drive transistor M0 according to a channel capacitor between the gate and the first electrode of the threshold compensation transistor M2; and
- a light emitting control circuit 20, electrically connected with a first power end VDD, the first electrode and the second electrode of the drive transistor M0 and a first electrode of a light emitting device L, and configured to turn on the first power end VDD with the first electrode of the drive transistor M0 and turn on the second electrode of the drive transistor M0 with the first electrode of the light emitting device L under control of a signal of a light emitting control line EM to drive the light emitting device L to emit light. The first power end VDD is connected with the first power signal line VD (as shown in FIG. 11G).

In the above-mentioned pixel circuit provided by the embodiment of the present disclosure, the compensation circuit is electrically connected with the gate of the drive transistor, and the compensation circuit may compensate for the voltage of the gate of the drive transistor according to the channel capacitor between the gate and the first electrode of the threshold compensation transistor M2. Thus, when a level of a signal of the second scan line G2 is switched, a voltage ΔVn1, lowered by the channel capacitor between the gate and the first electrode of the threshold compensation transistor M2, of the voltage of the gate of the drive transistor M0 may be compensated through the compensation circuit, thereby improving the stability of the voltage of the gate of the drive transistor.

In some embodiments, in the embodiment of the present disclosure, the first electrode of the light emitting device L is electrically connected with the light emitting control circuit 20, and a second electrode of the light emitting device L is electrically connected with a second power end VSS. Exemplarily, the first electrode, electrically connected with the light emitting control circuit 20, of the light emitting device L is a positive electrode of the light emitting device L; and the second electrode, electrically connected with the second power end VSS, of the light emitting device L is a negative electrode of the light emitting device L. For example, the light emitting device L may be an electroluminescent diode, such as an OLED, a QLED, a Micro LED and a Mini LED. In addition, the light emitting device L realizes light emission under the action of a current when the drive transistor M0 is in a saturated state. In addition, generally, the light emitting device L has a turn-on voltage, and emits light when the voltage difference between two ends of the light emitting device L is greater than or equal to the turn-on voltage.

In some embodiments, in the embodiment of the present disclosure, a voltage Vdd of the first power end VDD is generally positive, and a voltage Vss of the second power end VSS is generally grounded or negative. In addition, a voltage Vinit of an initialization signal line VINIT and the voltage Vss of the second power end VSS need to satisfy the formula: $Vinit-Vss<VL$, where VL is the turn-on voltage of the light emitting device L.

In some embodiments, in the embodiment of the present disclosure, as shown in FIG. 1, the drive transistor M0 may be a P-type transistor, where the gate of the drive transistor M0 may be its gate, the first electrode of the drive transistor M0 may be its source, and the second electrode of the drive transistor M0 may be its drain. Or, the drive transistor M0 may also be an N-type transistor, where the gate of the drive transistor M0 may be its gate, the first electrode of the drive transistor M0 may be its drain, and the second electrode of the drive transistor M0 may be its source. In actual applications, the type of the drive transistor M0 may be specifically designed and determined according to actual application requirements, which is not limited here.

Figure 2:
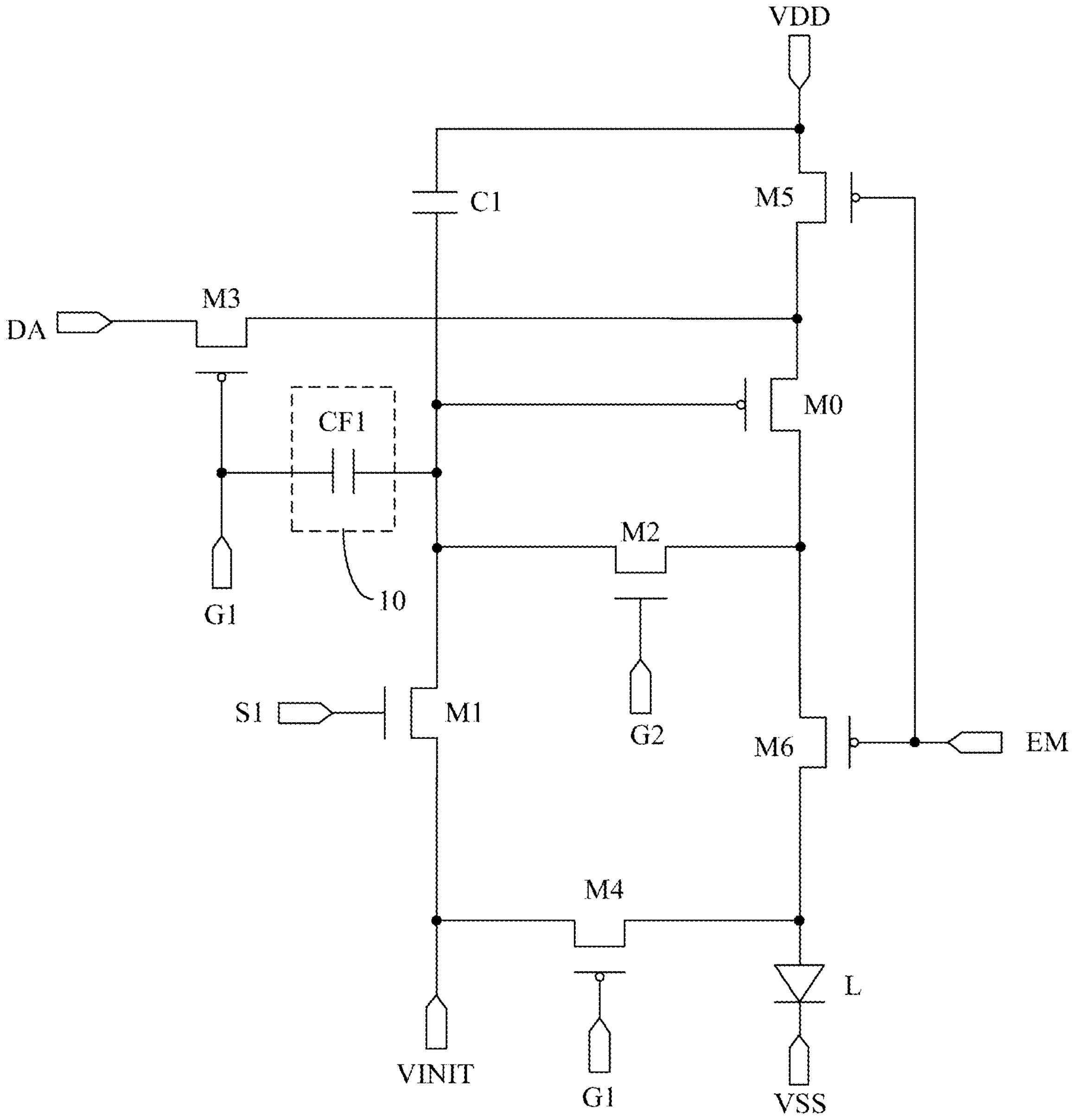
FIG. 2 is a schematic structural diagram of some other pixel circuits in an embodiment of the present disclosure.

In some embodiments, in the embodiment of the present disclosure, as shown in FIG. 2, the compensation circuit 10 may include: a first compensation capacitor CF1, where a first electrode of the first compensation capacitor CF1 is electrically connected with the gate of the drive transistor M0, and a second electrode of the first compensation capacitor CF1 is electrically connected with the first scan line G1. Exemplarily, a capacitance value of the channel capacitor between the gate and the first electrode of the threshold compensation transistor M2 is a first channel capacitance value CgsT2, and a difference between a capacitance value Cf1 of the first compensation capacitor CF1 and the first channel capacitance value CgsT2 satisfies $0\pm\Delta c1$. For example, $\Delta c1$ may be 0.1, or $\Delta c1$ may also be 0.01, or $\Delta c1$ may also be 0.05, which is not limited here. It should be noted that in the actual process, due to the limitation of process conditions or other factors, the capacitance value of the first compensation capacitor CF1 and the first channel capacitance value may not be exactly the same, and there may be some deviations. Therefore, the sameness relationship between the capacitance value of the first compensation capacitor CF1 and the first channel capacitance value only needs to substantially satisfy the above-mentioned conditions, which all belong to the protection scope of the present disclosure. For example, when the difference between the capacitance value of the first compensation capacitor CF1 and the first channel capacitance value satisfies $0\pm\Delta c1$, it may be considered that the capacitance value of the first compensation capacitor CF1 and the first channel capacitance value are allowed to be the same within the tolerable error range.

In some embodiments, in the embodiment of the present disclosure, as shown in FIG. 2, the pixel circuit may further include: a first reset transistor M1; a gate of the first reset transistor M1 is electrically connected with a first reset line S1, a first electrode of the first reset transistor M1 is electrically connected with the initialization signal line VINIT, and a second electrode of the first reset transistor M1 is electrically connected with the gate of the drive transistor M0.

In some embodiments, in the embodiment of the present disclosure, as shown in FIG. 1, the pixel circuit further includes: a second reset transistor M4, where a gate of the second reset transistor M4 is electrically connected with a second reset line S2, a first electrode of the second reset transistor M4 is electrically connected with the initialization signal line VINIT, and a second electrode of the second reset transistor M4 is electrically connected with the first electrode of the light emitting device L. Exemplarily, the second reset line S2 may be the same signal end as the first scan line G1. For example, as shown in FIG. 2, the gate of the data writing transistor M3 and the gate of the second reset transistor M4 are both electrically connected with the first scan line G1.

In some embodiments, in the embodiment of the present disclosure, as shown in FIG. 2, a pixel circuit may include: a first light emitting control transistor M5, a second light emitting control transistor M6 and a storage capacitor C1. A gate of the first light emitting control transistor M5 is electrically connected with the light emitting control line EM, a first electrode of the first light emitting control transistor M5 is electrically connected with the first power end VDD, and a second electrode of the first light emitting control transistor M5 is electrically connected with the first electrode of the drive transistor M0. A gate of the second light emitting control transistor M6 is electrically connected with the light emitting control line EM, a first electrode of the second light emitting control transistor M6 is electrically connected with the second electrode of the drive transistor M0, and a second electrode of the second light emitting control transistor M6 is electrically connected with the first electrode of the light emitting device L. A first electrode of the storage capacitor C1 is electrically connected with the first power end VDD, and a second electrode of the storage capacitor C1 is electrically connected with the gate of the drive transistor M0.

Exemplarily, as shown in FIG. 2, the data writing transistor M3, the second reset transistor M4, the first light emitting control transistor M5, the second light emitting control transistor M6, and the drive transistor M0 may all be set as P-type transistors. Of course, the data writing transistor M3, the second reset transistor M4, the first light emitting control transistor M5, the second light emitting control transistor M6, and the drive transistor M0 may all be set as N-type transistors. Of course, in actual applications, the specific types of the data writing transistor M3, the second reset transistor M4, the first light emitting control transistor M5, the second light emitting control transistor M6, and the drive transistor M0 may be determined according to actual application requirements, which is not limited here.

Exemplarily, as shown in FIG. 2, both the first reset transistor M1 and the threshold compensation transistor M2 may be set as N-type transistors. Of course, both the first reset transistor M1 and the threshold compensation transistor M2 may be set as P-type transistors. Of course, in actual applications, the specific types of the first reset transistor M1 and the threshold compensation transistor M2 may be determined according to actual application requirements, which is not limited here.

Exemplarily, in the embodiment of the present disclosure, the P-type transistor is turned on under the action of a low-level signal, and is turned off under the action of a high-level signal; and the N-type transistor is turned on under the action of a high-level signal, and is turned off under the action of a low-level signal.

Exemplarily, in the embodiment of the present disclosure, gates of the above-mentioned transistors may be used as their gates, first electrodes of the transistors may be used as their sources, and second electrodes of the transistors may be used as their drains; or the first electrodes of the above-mentioned transistors may be used as their drains, and the second electrodes of the above-mentioned transistors may be used as their sources, which is not specifically distinguished here.

Generally, transistors that use low temperature poly-silicon (LTPS) materials as active layers have high mobility, may be made thinner and smaller, and have lower power consumption. In some embodiments, in the embodiment of the present disclosure, a material of an active layer of the drive transistor M0 may include an LTPS material, the material of the active layer of the data writing transistor M3 may include the LTPS material, a material of the second reset transistor M4 may include the LTPS material, a material of the first light emitting control transistor M5 may include the LTPS material, and a material of the second light emitting control transistor M6 may include the LTPS material. That is, the data writing transistor M3, the second reset transistor M4, the first light emitting control transistor M5, the second light emitting control transistor M6, and the drive transistor M0 are all set as LTPS type transistors, so that the data writing transistor M3, the second reset transistor M4, the first light emitting control transistor M5, the second light emitting control transistor M6, and the drive transistor M0 have higher mobility, may be made thinner and smaller, and have lower power consumption.

Generally, leakage currents of transistors that use metal oxide semiconductor materials as active layers are relatively small. Therefore, in order to reduce leakage currents, In some embodiments, in the embodiment of the present disclosure, a material of an active layer of the first reset transistor M1 may include a metal oxide semiconductor material, and the material of the active layer of the threshold compensation transistor M2 may include the metal oxide semiconductor material. That is, both the first reset transistor M1 and the threshold compensation transistor M2 are set as oxide type transistors, so that the leakage currents of the first reset transistor M1 and the threshold compensation transistor M2 may be relatively small. Exemplarily, the metal oxide semiconductor material may be indium gallium zinc oxide (IGZO). Of course, the metal oxide semiconductor material may also be other metal oxide semiconductor materials, which is not limited here. Thus, the leakage currents of the first reset transistor M1 and the threshold compensation transistor M2 when the first reset transistor M1 and the threshold compensation transistor M2 are turned off may be reduced; and when the light emitting device L emits light, the interference of the leakage currents on the voltage of the gate of the drive transistor M0 may be reduced, thereby improving the stability of a drive current for the drive transistor M0 to drive the light emitting device L to emit light.

In the pixel circuit provided by the embodiment of the present disclosure, processes for preparing the LTPS type transistors and the oxide type transistors are combined to prepare the pixel circuit with low temperature poly-silicon combined with oxides, so that a leakage current of the gate of the drive transistor M0 is relatively small, and the power consumption is relatively low. Therefore, when the pixel circuit is applied to a display apparatus with an electroluminescent display panel, the stability of the voltage of the gate of the drive transistor M0 may be improved, and especially when the display apparatus reduces the refresh rate for display, the uniformity of display may be ensured.

Figure 3:
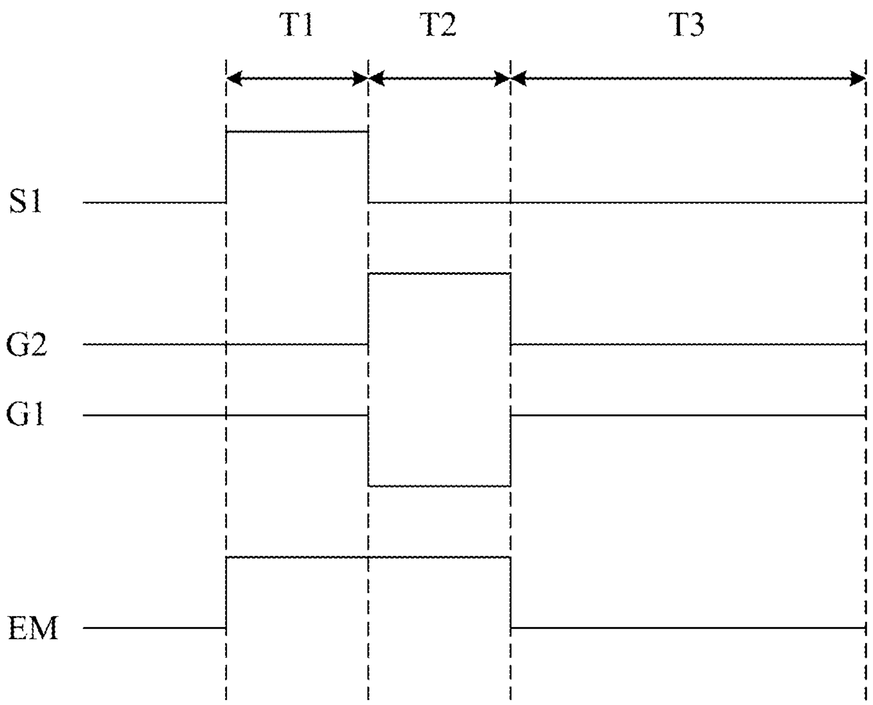
FIG. 3 is a signal timing diagram of some pixel circuits in an embodiment of the present disclosure.

The operation of the pixel circuit provided by the embodiment of the present disclosure will now be described with reference to a signal timing diagram shown in FIG. 3, taking the structure shown in FIG. 2 as an example. In the following description, a high level is denoted by 1, and a low level is denoted by 0. It should be noted that 1 and 0 are logic levels only to better explain the specific operation of the embodiment of the present disclosure, and not specific voltage values.

It should be noted that a signal of the first scan line G1 and a signal of the second scan line G2 are composed of a high-level signal and a low-level signal, respectively. A voltage of the high-level signal is typically a high voltage VGH and a voltage of the low-level signal is typically a low voltage VGL. Of course, specific values of the high voltage VGH and the low voltage VGL may be designed and determined according to actual application requirements, which is not limited here.

Exemplarily, the absolute values of high and low levels may be equal, for example, the high level is +5 V, and the low level is −5 V. Or, the high level is +6 V, and the low level is −6 V. Or, the high level is +7 V, and the low level is −7 V. Or, the absolute values of the high and low levels may also be unequal, for example, the high level is a value greater than 0, and the low level is 0 V. Of course, in actual applications, the relationship between the absolute values of the high and low levels may be determined according to the actual application requirements, which is not limited here.

In a reset stage T1, S1=1, G2=0, G1=1, EM=1.

Since S1=1, the first reset transistor M1 is turned on to provide a signal of the initialization signal line VINIT to the gate of the drive transistor M0 to initialize the gate of the drive transistor M0. Since G2=0, the threshold compensation transistor M2 is turned off. Since G1=1, both the data writing transistor M3 and the second reset transistor M4 are turned off. Since EM=1, both the first light emitting control transistor M5 and the second light emitting control transistor M6 are turned off. A voltage of the second electrode of the first compensation capacitor CF1 is the high voltage VGH of the high-level signal of the first scan line G1, and a voltage of the first electrode of the first compensation capacitor CF1 is the voltage Vinit of the initialization signal line VINIT.

In a data writing stage T2, S1=0, G2=1, G1=0, and EM=1.

Since G1=0, the data writing transistor M3 and the second reset transistor M4 are both turned on. Since G2=1, the threshold compensation transistor M2 is turned on. The turned-on data writing transistor M3 inputs a data voltage Vda of the data line DA to the first electrode of the drive transistor M0. The turned-on threshold compensation transistor M2 turns on the gate and the second electrode of the drive transistor M0, so that the drive transistor M0 forms a diode electrical connection structure, the gate of the drive transistor M0 is charged through the data voltage Vda, and the voltage of the gate of the drive transistor M0 is made to successfully be Vda+Vth. The turned-on second reset transistor M4 provides the signal of the initialization signal line VINIT to the first electrode of the light emitting device L, to initialize the first electrode of the light emitting device L. The voltage of the second electrode of the first compensation capacitor CF1 is the low voltage VGL of the low-level signal of the first scan line G1, and the voltage of the first electrode of the first compensation capacitor CF1 is Vda+Vth. Since S1=0, the first reset transistor M1 is turned off. Since EM=1, both the first light emitting control transistor M5 and the second light emitting control transistor M6 are turned off.

In a light emitting stage T3, S1=0, G2=0, G1=1, and EM=0.

Since the second scan line G2 is switched from the high voltage VGH of the high-level signal to the low voltage VGL of the low-level signal, the voltage of the gate of the drive transistor M0 may be changed by a voltage ΔVn11 on the basis of Vda+Vth.

$$\Delta Vn11 = \frac{CgsT2}{CgsT2 + Cc1 + Cf1 + Co} * (VGL - VGH);$$

where CgsT2 represents the first channel capacitance value, Cc1 represents a capacitance value of the storage capacitor C1, Cf1 represents the capacitance value of the first compensation capacitor CF1, and Co represents other related capacitance values (generally being fixed values).

Since the first scan line G1 is switched from the low voltage VGL of the low-level signal to the high voltage VGH of the high-level signal, the voltage of the gate of the drive transistor M0 may be changed by a voltage ΔVn12 on the basis of Vda+Vth; where $$\Delta Vn12 = \frac{Cf1}{CgsT2 + Cc1 + Cf1 + Co} * (VGH - VGL).$$

Thus, the amount of change in the voltage of the gate of the drive transistor M0 is: ΔVn10=ΔVn11+ΔVn12. Since the difference between the capacitance value Cf1 of the first compensation capacitor CF1 and the first channel capacitance value CgsT2 satisfies 0±Δc1, it may be considered that the capacitance value Cf1 of the first compensation capacitor CF1 and the first channel capacitance value CgsT2 are equal. Therefore, ΔVn11 and ΔVn12 may cancel each other out, and ΔVn10 may be 0. In this way, after the light emitting stage T3, the voltage of the gate of the drive transistor M0 may be stabilized at Vda+Vth.

Since EM=0, the first light emitting control transistor M5 and the second light emitting control transistor M6 are both turned on. The turned-on first light emitting control transistor M5 provides a voltage of the first power end VDD to the first electrode of the drive transistor M0. The drive transistor M0 generates an operating current Ids under the action of voltages of the gate and first electrode of the drive transistor M0. $Ids=K(Vdd-Vda)^2$, where K is a structural parameter. The turned-on second light emitting control transistor M6 turns on the second electrode of the drive transistor M0 and the first electrode of the light emitting device L, so that the light emitting device L is driven through the operating current Ids to emit light. Therefore, an operating current generated by the pixel circuit provided by the embodiment of the present disclosure has nothing to do with the threshold voltage Vth of the drive transistor M0.

Figure 4:
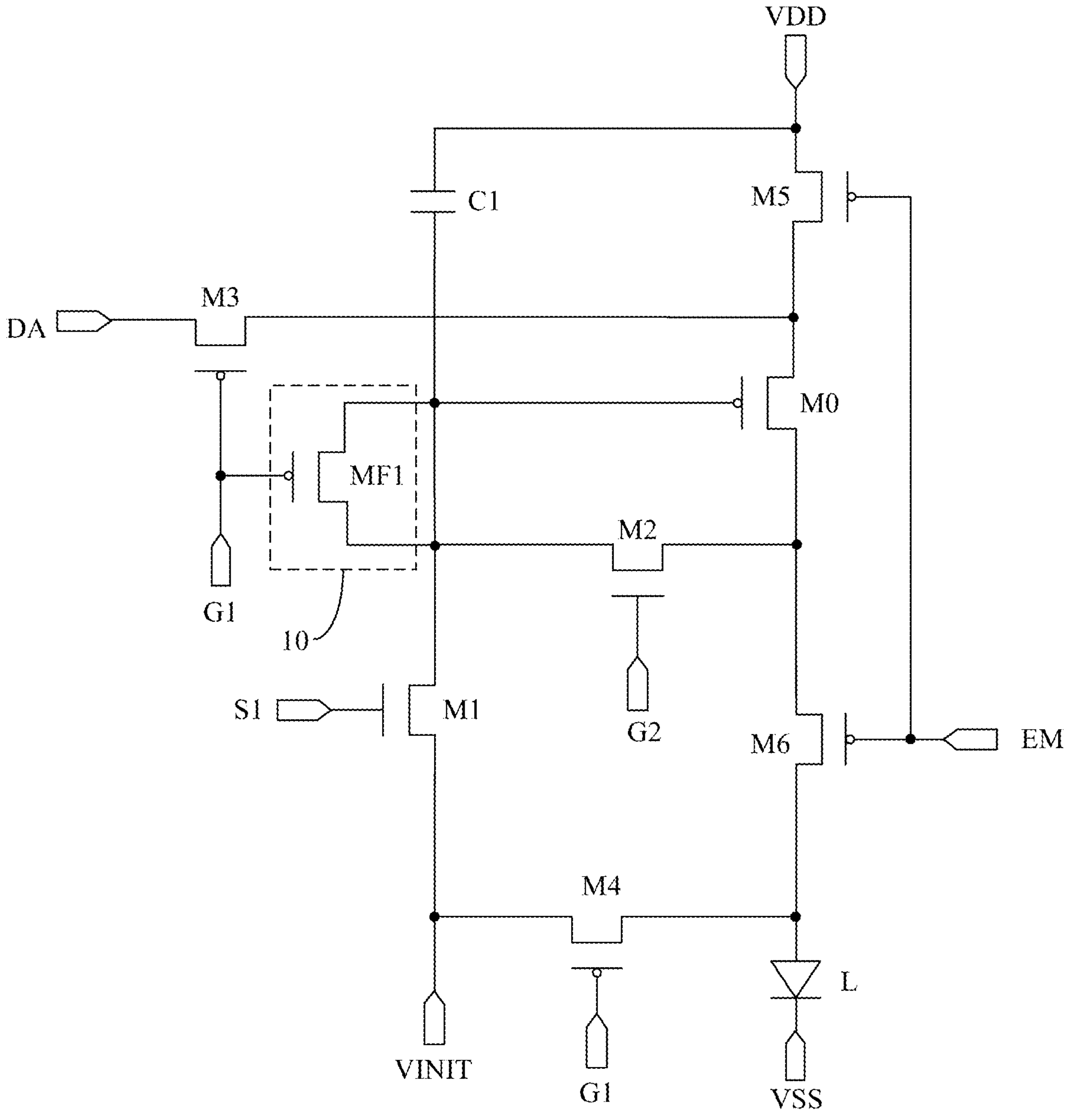
FIG. 4 is a schematic structural diagram of some other pixel circuits in an embodiment of the present disclosure.

The embodiment of the present disclosure further provides some pixel circuits. The schematic structural diagram of the pixel circuits is shown in FIG. 4, which is modified in accordance with the implementation in the above-mentioned embodiment. The following only describes the differences between the present embodiment and the above-mentioned embodiment, and the similarities are not repeated here.

In some embodiments, in the embodiment of the present disclosure, as shown in FIG. 4, the compensation circuit 10 may include: a first compensation control transistor, where a gate of the first compensation control transistor is electrically connected with the first scan line G1, and both a first electrode and a second electrode of the first compensation control transistor are electrically connected with the gate of the drive transistor M0. Exemplarily, the first compensation control transistor may be a P-type transistor. Further, a material of an active layer of the first compensation control transistor may be a low temperature poly-silicon material or a metal oxide semiconductor material, which is not limited here.

In some embodiments, in the embodiment of the present disclosure, a capacitance value of a channel capacitor between the gate and the first electrode of the first compensation control transistor is a second channel capacitance value CgsMF1, and a capacitance value of a channel capacitor between the gate and the second electrode of the first compensation control transistor is a third channel capacitance value CgdMF1; and the sum of the second channel capacitance value CgsMF1 and the third channel capacitance value CgdMF1 is a total channel capacitance value Cm1MF1. A difference between the total channel capacitance value CmMF1 and the first channel capacitance value CgsT2 satisfies 0±Δc2. For example, Δc2 may be 0.1, or or 0.05, which is not limited here. It should be noted that in the actual process, due to the limitation of process conditions or other factors, the first channel capacitance value may not be exactly the same as the total channel capacitance value, and there may be some deviations. Therefore, the sameness relationship between the first channel capacitance value and the total channel capacitance value only needs to substantially satisfy the above-mentioned conditions, which all belong to the protection scope of the present disclosure. For example, when the difference between the first channel capacitance value and the total channel capacitance value satisfies 0±Δc2, it may be considered that the first channel capacitance value and the total channel capacitance value are allowed to be the same within the tolerable error range.

The operation of the pixel circuit provided by the embodiment of the present disclosure will now be described with reference to the signal timing diagram shown in FIG. 3, taking the structure shown in FIG. 4 as an example. In the following description, the high level is denoted by 1, and the low level is denoted by 0. It should be noted that 1 and 0 are logic levels only to better explain the specific operation of the embodiment of the present disclosure, and not specific voltage values.

It should be noted that the signal of the first scan line G1 and the signal of the second scan line G2 are composed of the high-level signal and the low-level signal, respectively. The voltage of the high-level signal is typically the high voltage VGH and the voltage of the low-level signal is typically the low voltage VGL. Of course, the specific values of the high voltage VGH and the low voltage VGL may be designed and determined according to actual application requirements, which is not limited here.

In the reset stage T1, S1=1, G2=0, G1=1, and EM=1.

Since S1=1, the first reset transistor M1 is turned on to provide the signal of the initialization signal line VINIT to the gate of the drive transistor M0 to initialize the gate of the drive transistor M0. Since G2=0, the threshold compensation transistor M2 is turned off. Since G1=1, the data writing transistor M3, the first compensation control transistor and the second reset transistor M4 are all turned off. Since EM=1, both the first light emitting control transistor M5 and the second light emitting control transistor M6 are turned off.

In the data writing stage T2, S1=0, G2=1, G1=0, and EM=1.

Since G1=0, the data writing transistor M3, the second reset transistor M4 and the first compensation control transistor are all turned on. Since G2=1, the threshold compensation transistor M2 is turned on. The turned-on data writing transistor M3 inputs the data voltage Vda of the data line DA to the first electrode of the drive transistor M0. The turned-on threshold compensation transistor M2 turns on the gate and the second electrode of the drive transistor M0, so that the drive transistor M0 forms a diode electrical connection structure, the gate of the drive transistor M0 is charged through the data voltage Vda, and the voltage of the gate of the drive transistor M0 is made to successfully be Vda+Vth. The turned-on second reset transistor M4 provides the signal of the initialization signal line VINIT to the first electrode of the light emitting device L to initialize the first electrode of the light emitting device L. Since S1=0, the first reset transistor M1 is turned off. Since EM=1, both the first light emitting control transistor M5 and the second light emitting control transistor M6 are turned off. In this stage, the first compensation control transistor has no influence on the voltage of the gate of the drive transistor M0.

In the light emitting stage T3, S1=0, G2=0, G1=1, and EM=0.

Since the second scan line G2 is switched from the high voltage VGH of the high-level signal to the low voltage VGL of the low-level signal, the voltage of the gate of the drive transistor M0 may be changed by a voltage ΔVn21 on the basis of Vda+Vth.

$$\Delta Vn21 = \frac{CgsT2}{CgsT2 + Cc1 + CgsMF1 + CgdMF1 + Co} * (VGL - VGH),$$

where CgsT2 represents the first channel capacitance value, Cc1 represents the capacitance value of the storage capacitor C1, CgsMF1 represents the second channel capacitance value, Cgd1MF1 represents the third channel capacitance value, and Co represents other related capacitance values (generally being fixed values).

Since the first scan line G1 is switched from the low voltage VGL of the low-level signal to the high voltage VGH of the high-level signal, the voltage of the gate of the drive transistor M0 may be changed by a voltage ΔVn22 on the basis of Vda+Vth, where $$\Delta Vn22 = \frac{CgsMF1 + CgdMF1}{CgsT2 + Cc1 + CgsMF1 + CgdMF1 + Co} * (VGH - VGL).$$

Thus, the amount of change in the voltage of the gate of the drive transistor M0 is: ΔVn20=ΔVn21+ΔVn22. Since the difference between the total channel capacitance value CmMF1, namely the sum of the second channel capacitance value CgsMF1 and the third channel capacitance value CgdMF1, and the first channel capacitance value CgsT2 satisfies it may be considered that the total channel capacitance value CmMF1 and the first channel capacitance value CgsT2 are equal. Therefore, ΔVn21 and ΔVn22 may cancel each other out, and ΔVn20 may be 0. In this way, after the light emitting stage T3, the voltage of the gate of the drive transistor M0 may be stabilized at Vda+Vth.

Since EM=0, the first light emitting control transistor M5 and the second light emitting control transistor M6 are both turned on. The turned-on first light emitting control transistor M5 provides the voltage of the first power end VDD to the first electrode of the drive transistor M0. The drive transistor M0 generates the operating current Ids under the action of the voltages of the gate and first electrode of the drive transistor M0. $Ids=K(Vdd-Vda)^2$, where K is a structural parameter. The turned-on second light emitting control transistor M6 turns on the second electrode of the drive transistor M0 and the first electrode of the light emitting device L, so that the light emitting device L is driven through the operating current Ids to emit light. Therefore, the operating current generated by the pixel circuit provided by the embodiment of the present disclosure has nothing to do with the threshold voltage Vth of the drive transistor M0.

Figure 5:
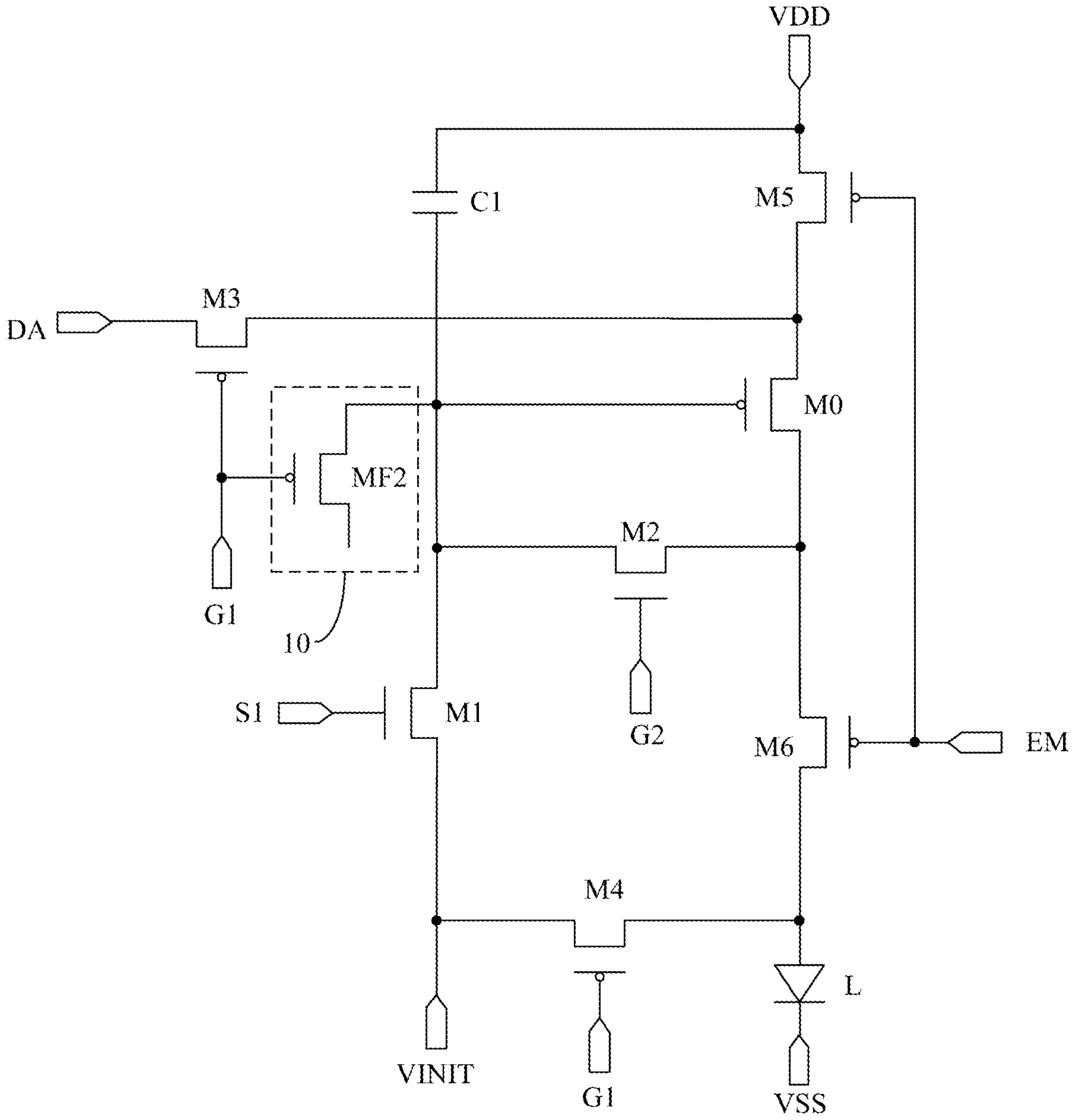
FIG. 5 is a schematic structural diagram of some other pixel circuits in an embodiment of the present disclosure.

The embodiment of the present disclosure further provides some pixel circuits. The schematic structural diagram of the pixel circuits is shown in FIG. 5, which is modified in accordance with the implementation in the above-mentioned embodiment. The following only describes the differences between the present embodiment and the above-mentioned embodiment, and the similarities are not repeated here.

In some embodiments, in the embodiment of the present disclosure, as shown in FIG. 5, the compensation circuit 10 may further include: a second compensation control transistor, where a gate of the second compensation control transistor is electrically connected with the first scan line G1, a first electrode of the second compensation control transistor is electrically connected with the gate of the drive transistor M0, and a second electrode of the second compensation control transistor is in suspended connection. Exemplarily, the second compensation control transistor may be a P-type transistor. Further, a material of an active layer of the second compensation control transistor may be a low temperature poly-silicon material or a metal oxide semiconductor material, which is not limited here.

In some embodiments, in the embodiment of the present disclosure, a capacitance value of a channel capacitor between the gate and the first electrode of the second compensation control transistor is a fourth channel capacitance value CgsMF2, and a difference between the fourth channel capacitance value CgsMF2 and the first channel capacitance value CgsT2 satisfies 0±Δc3. For example, Δc3 may be 0.1, or 0.01, or 0.05, which is not limited here. It should be noted that in the actual process, due to the limitation of process conditions or other factors, the first channel capacitance value may not be exactly the same as the fourth channel capacitance value, and there may be some deviations. Therefore, the sameness relationship between the first channel capacitance value and the fourth channel capacitance value only needs to substantially satisfy the above-mentioned conditions, which all belong to the protection scope of the present disclosure. For example, when the difference between the first channel capacitance value and the fourth channel capacitance value satisfies 0±Δc3, it may be considered that the first channel capacitance value and the fourth channel capacitance value are allowed to be the same within the tolerable error range.

The operation of the pixel circuit provided by the embodiment of the present disclosure will now be described with reference to the signal timing diagram shown in FIG. 3, taking the structure shown in FIG. 5 as an example. In the following description, the high level is denoted by 1, and the low level is denoted by 0. It should be noted that 1 and 0 are logic levels only to better explain the specific operation of the embodiment of the present disclosure, and not specific voltage values.

It should be noted that the signal of the first scan line G1 and the signal of the second scan line G2 are composed of the high-level signal and the low-level signal, respectively. The voltage of the high-level signal is typically the high voltage VGH and the voltage of the low-level signal is typically the low voltage VGL. Of course, the specific values of the high voltage VGH and the low voltage VGL may be designed and determined according to actual application requirements, which is not limited here.

In the reset stage T1, S1=1, G2=0, G1=1, and EM=1.

Since S1=1, the first reset transistor M1 is turned on to provide the signal of the initialization signal line VINIT to the gate of the drive transistor M0 to initialize the gate of the drive transistor M0. Since G2=0, the threshold compensation transistor M2 is turned off. Since G1=1, the data writing transistor M3, the second compensation control transistor and the second reset transistor M4 are all turned off. Since EM=1, both the first light emitting control transistor M5 and the second light emitting control transistor M6 are turned off.

In the data writing stage T2, S1=0, G2=1, G1=0, and EM=1.

Since G1=0, the data writing transistor M3, the second reset transistor M4 and the second compensation control transistor are all turned on. Since G2=1, the threshold compensation transistor M2 is turned on. The turned-on data writing transistor M3 inputs the data voltage Vda of the data line DA to the first electrode of the drive transistor M0. The turned-on threshold compensation transistor M2 turns on the gate and the second electrode of the drive transistor M0, so that the drive transistor M0 forms a diode electrical connection structure, the gate of the drive transistor M0 is charged through the data voltage Vda, and the voltage of the gate of the drive transistor M0 is made to successfully be Vda+Vth. The turned-on second reset transistor M4 provides the signal of the initialization signal line VINIT to the first electrode of the light emitting device L to initialize the first electrode of the light emitting device L. Since S1=0, the first reset transistor M1 is turned off. Since EM=1, both the first light emitting control transistor M5 and the second light emitting control transistor M6 are turned off. In this stage, the second compensation control transistor has no influence on the voltage of the gate of the drive transistor M0.

In the light emitting stage T3, S1=0, G2=0, G1=1, and EM=0.

Since the second scan line G2 is switched from the high voltage VGH of the high-level signal to the low voltage VGL of the low-level signal, the voltage of the gate of the drive transistor M0 may be changed by a voltage ΔVn31 on the basis of Vda+Vth.

$$\Delta Vn31 = \frac{CgsT2}{CgsT2 + Cc1 + CgsMF2 + Co} * (VGL - VGH),$$

where CgsT2 represents the first channel capacitance value, Cc1 represents the capacitance value of the storage capacitor C1, CgsMF2 represents the fourth channel capacitance value, and Co represents other related capacitance values (generally being fixed values).

Since the first scan line G1 is switched from the low voltage VGL of the low-level signal to the high voltage VGH of the high-level signal, the voltage of the gate of the drive transistor M0 may be changed by a voltage ΔVn32 on the basis of Vda+Vth.

$$\Delta Vn32 = \frac{CgsMF2}{CgsT2 + Cc1 + CgsMF2 + Co} * (VGH - VGL).$$

Thus, the amount of change in the voltage of the gate of the drive transistor M0 is: ΔVn30=ΔVn31+ΔVn32. Since the difference between the fourth channel capacitance value CgsMF2 and the first channel capacitance value CgsT2 satisfies 0±Δc3, it may be considered that the fourth channel capacitance value CgsMF2 and the first channel capacitance value CgsT2 are equal. Therefore, ΔVn31 and ΔVn32 may cancel each other out, and ΔVn30 may be 0. In this way, after the light emitting stage T3, the voltage of the gate of the drive transistor M0 may be stabilized at Vda+Vth.

Since EM=0, the first light emitting control transistor M5 and the second light emitting control transistor M6 are both turned on. The turned-on first light emitting control transistor M5 provides the voltage of the first power end VDD to the first electrode of the drive transistor M0. The drive transistor M0 generates the operating current Ids under the action of the voltages of the gate and first electrode of the drive transistor M0. $Ids=K(Vdd-Vda)^2$, where K is a structural parameter. The turned-on second light emitting control transistor M6 turns on the second electrode of the drive transistor M0 and the first electrode of the light emitting device L, so that the light emitting device L is driven through the operating current Ids to emit light. Therefore, the operating current generated by the pixel circuit provided by the embodiment of the present disclosure has nothing to do with the threshold voltage Vth of the drive transistor M0.

Figure 6:
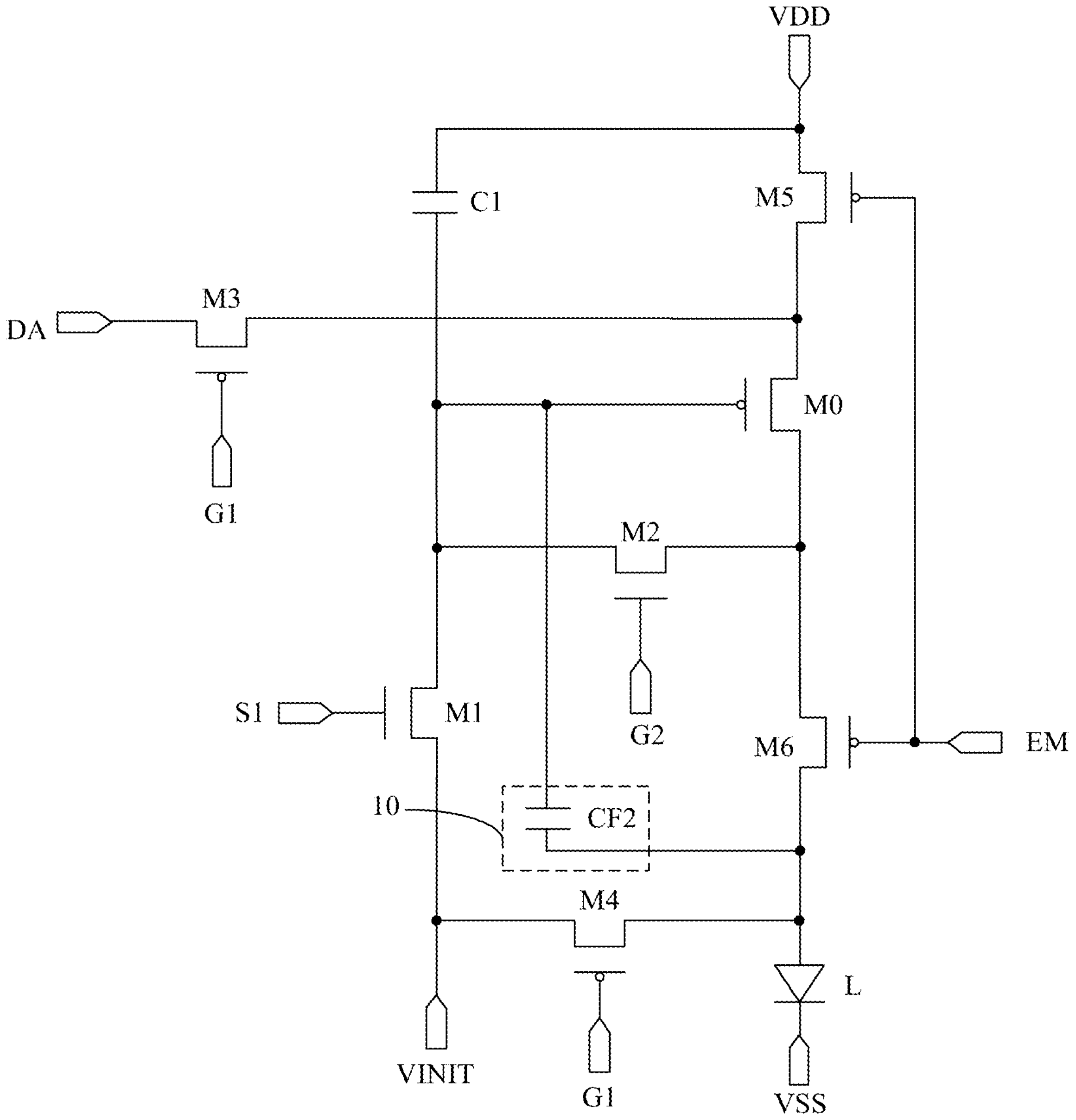
FIG. 6 is a schematic structural diagram of some other pixel circuits in an embodiment of the present disclosure.

The embodiment of the present disclosure further provides some pixel circuits. The schematic structural diagram of the pixel circuits is shown in FIG. 6, which is modified in accordance with the implementation in the above-mentioned embodiment. The following only describes the differences between the present embodiment and the above-mentioned embodiment, and the similarities are not repeated here.

In some embodiments, in the embodiment of the present disclosure, as shown in FIG. 6, the compensation circuit 10 may further include: a second compensation capacitor CF2. A first electrode of the second compensation capacitor CF2 is electrically connected with the gate of the drive transistor M0, and a second electrode of the second compensation capacitor CF2 is electrically connected with the first electrode of the light emitting device L. Exemplarily, a capacitance value Cf2 of the second compensation capacitor CF2 is related to the first channel capacitance value CgsT2.

The operation of the pixel circuit provided by the embodiment of the present disclosure will now be described with reference to the signal timing diagram shown in FIG. 3, taking the structure shown in FIG. 6 as an example. In the following description, the high level is denoted by 1, and the low level is denoted by 0. It should be noted that 1 and 0 are logic levels only to better explain the specific operation of the embodiment of the present disclosure, and not specific voltage values.

In the reset stage T1, S1=1, G2=0, G1=1, and EM=1.

Since S1=1, the first reset transistor M1 is turned on to provide the signal of the initialization signal line VINIT to the gate of the drive transistor M0 to initialize the gate of the drive transistor M0. Since G2=0, the threshold compensation transistor M2 is turned off. Since G1=1, the data writing transistor M3 and the second reset transistor M4 are all turned off. Since EM=1, both the first light emitting control transistor M5 and the second light emitting control transistor M6 are turned off. A voltage of the first electrode of the second compensation capacitor CF2 is the voltage Vinit of the initialization signal line VINIT, and a voltage of the second electrode of the second compensation capacitor CF2 is the voltage of the first electrode of the light emitting device L.

In the data writing stage T2, S1=0, G2=1, G1=0, and EM=1.

Since G1=0, the data writing transistor M3 and the second reset transistor M4 are both turned on. Since G2=1, the threshold compensation transistor M2 is turned on. The turned-on data writing transistor M3 inputs the data voltage Vda of the data line DA to the first electrode of the drive transistor M0. The turned-on threshold compensation transistor M2 turns on the gate and the second electrode of the drive transistor M0, so that the drive transistor M0 forms a diode electrical connection structure, the gate of the drive transistor M0 is charged through the data voltage Vda, and the voltage of the gate of the drive transistor M0 is made to successfully be Vda+Vth. The turned-on second reset transistor M4 provides the signal of the initialization signal line VINIT to the first electrode of the light emitting device L to initialize the first electrode of the light emitting device L. The voltage of the first electrode of the second compensation capacitor CF2 is Vda+Vth, and the voltage of the second electrode of the second compensation capacitor CF2 is the voltage Vinit of the initialization signal line VINIT. Since S1=0, the first reset transistor M1 is turned off. Since EM=1, both the first light emitting control transistor M5 and the second light emitting control transistor M6 are turned off.

In the light emitting stage T3, S1=0, G2=0, G1=1, and EM=0.

Since the second scan line G2 is switched from the high voltage VGH of the high-level signal to the low voltage VGL of the low-level signal, the voltage of the gate of the drive transistor M0 may be changed by a voltage ΔVn41 on the basis of Vda+Vth.

$$\Delta Vn41 = \frac{CgsT2}{CgsT2 + Cc1 + Cf2 + Co} * (VGL - VGH),$$

where CgsT2 represents the first channel capacitance value, Cc1 represents the capacitance value of the storage capacitor C1, Cf2 represents the capacitance value of the second compensation capacitor CF2, and Co represents other related capacitance values (generally being fixed values).

Since the voltage of the first electrode of the light emitting device L is changed from Vinit to Vss+VL, the voltage of the gate of the drive transistor M0 may be changed by a voltage ΔVn42 on the basis of Vda+Vth.

$$\Delta Vn42 = \frac{Cf2}{CgsT2 + Cc1 + Cf2 + Co} * (VL + Vss - V\,init).$$

Thus, the amount of change in the voltage of the gate of the drive transistor M0 is: ΔVn40=ΔVn41+ΔVn42. By enabling CgsT2*(VGL−VGH)+C12*(VL+Vss−Vinit) to be substantially 0, ΔVn41 and ΔVn42 may cancel each other out, and ΔVn40 may be 0. In this way, after the light emitting stage T3, the voltage of the gate of the drive transistor M0 may be stabilized at Vda+Vth.

Since EM=0, the first light emitting control transistor M5 and the second light emitting control transistor M6 are both turned on. The turned-on first light emitting control transistor M5 provides the voltage of the first power end VDD to the first electrode of the drive transistor M0. The drive transistor M0 generates the operating current Ids under the action of the voltages of the gate and first electrode of the drive transistor M0. Ids=K(Vdd-Vda) 2, where K is a structural parameter. The turned-on second light emitting control transistor M6 turns on the second electrode of the drive transistor M0 and the first electrode of the light emitting device L, so that the light emitting device L is driven through the operating current Ids to emit light. Therefore, the operating current generated by the pixel circuit provided by the embodiment of the present disclosure has nothing to do with the threshold voltage Vth of the drive transistor M0.

Figure 7A:
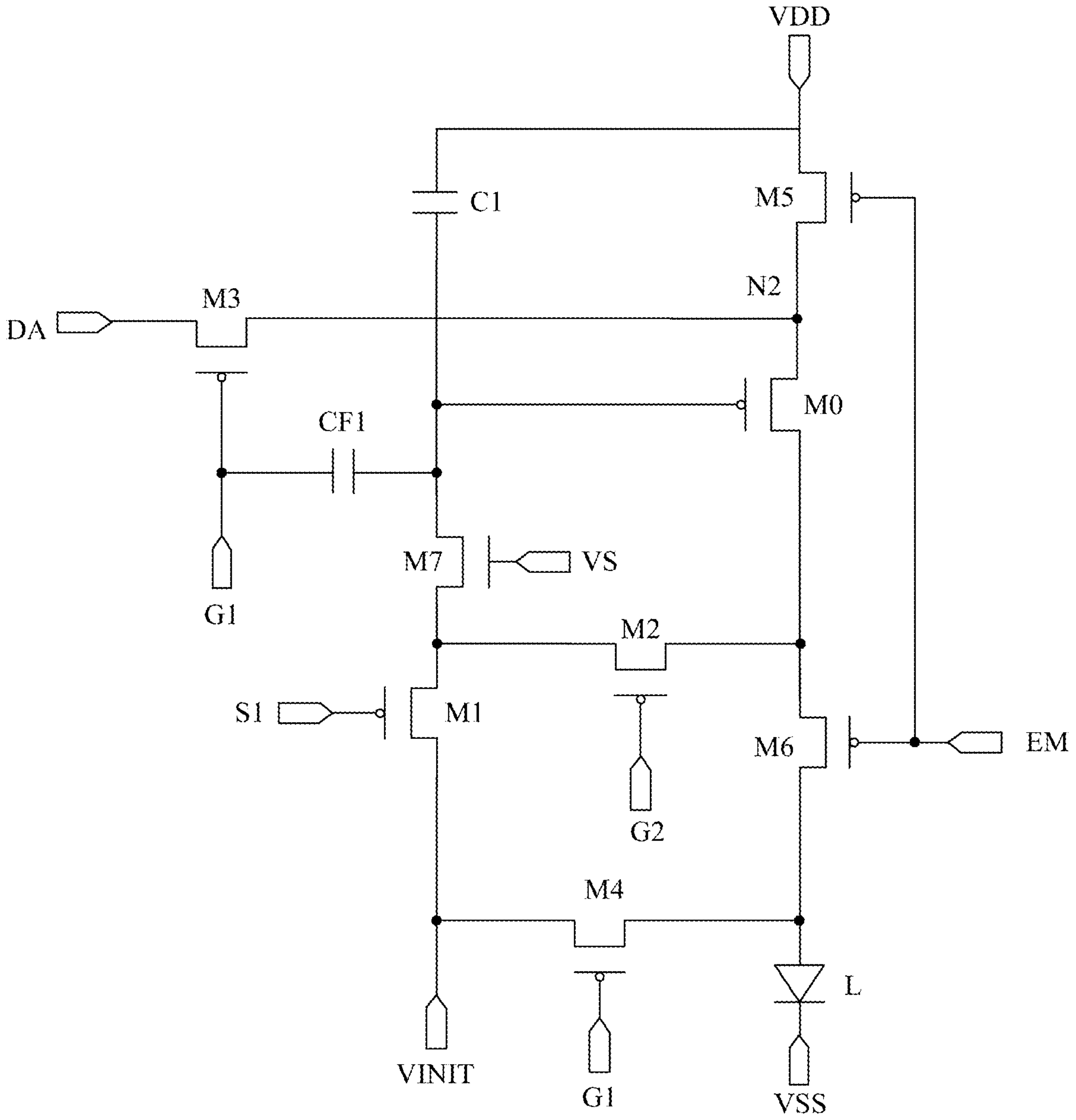
FIG. 7A is a schematic structural diagram of some other pixel circuits in an embodiment of the present disclosure.

The embodiment of the present disclosure further provides some pixel circuits. The schematic structural diagram of the pixel circuits is shown in FIG. 7A, which is modified in accordance with the implementation in the above-mentioned embodiment. The following only describes the differences between the present embodiment and the above-mentioned embodiment, and the similarities are not repeated here.

In some embodiments, in the embodiment of the present disclosure, as shown in FIG. 7A, the pixel circuit may further include: a stable transistor M7. A gate of the stable transistor M7 is electrically connected with a stable control signal end VS, a first electrode of the stable transistor M7 is electrically connected with the gate of the drive transistor M0, and a second electrode of the stable transistor M7 is electrically connected with the second electrode of the first reset transistor M1 and the first electrode of the threshold compensation transistor M2. That is, the second electrode of the first reset transistor M1 and the first electrode of the threshold compensation transistor M2 are electrically with the gate of the drive transistor M0 through the stable transistor M7.

Exemplarily, the first reset transistor M1 and the threshold compensation transistor M2 may be P-type transistors, and the materials of the active layers of the first reset transistor M1 and the threshold compensation transistor M2 are LTPS materials.

Exemplarily, the stable transistor M7 may be an N-type transistor, and a material of an active layer of the stable transistor M7 may be a metal oxide semiconductor material.

Figure 7B:
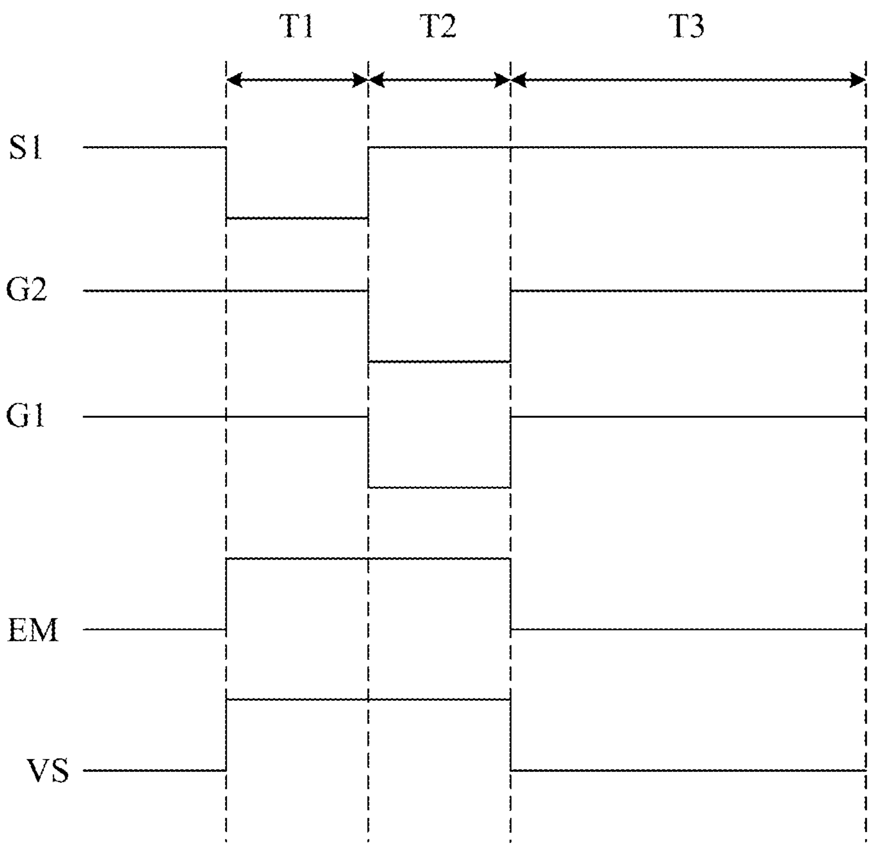
FIG. 7B is a signal timing diagram of some other pixel circuits in an embodiment of the present disclosure.

The operation of the pixel circuit provided by the embodiment of the present disclosure will now be described with reference to a signal timing diagram shown in FIG. 7B, taking the structure shown in FIG. 7A as an example. In the following description, the high level is denoted by 1, and the low level is denoted by 0. It should be noted that 1 and 0 are logic levels only to better explain the specific operation of the embodiment of the present disclosure, and not specific voltage values.

In the reset stage T1, S1=0, G2=1, G1=1, EM=1, and VS=1.

Since S1=0, the first reset transistor M1 is turned on to provide the signal of the initialization signal line VINIT to the second electrode of the stable transistor M7. Since VS=1, the stable transistor M7 is turned on to provide the signal of the initialization signal line VINIT to the gate of the drive transistor M0 so as to initialize the gate of the drive transistor M0. Since G2=1, the threshold compensation transistor M2 is turned off. Since G1=1, the data writing transistor M3 and the second reset transistor M4 are both turned off. Since EM=1, both the first light emitting control transistor M5 and the second light emitting control transistor M6 are turned off. The voltage of the second electrode of the first compensation capacitor CF1 is the high voltage VGH of the high-level signal of the first scan line G1, and the voltage of the first electrode of the first compensation capacitor CF1 is the voltage Vinit of the initialization signal line VINIT.

In the data writing stage T2, S1=1, G2=0, G1=0, EM=1, and VS=1.

Since G1=0, the data writing transistor M3 and the second reset transistor M4 are both turned on. Since G2=0, the threshold compensation transistor M2 is turned on. Since VS=1, the stable transistor M7 is turned on. The turned-on data writing transistor M3 inputs the data voltage Vda of the data line DA to the first electrode of the drive transistor M0. The turned-on threshold compensation transistor M2 and the turned-on stable transistor M7 turn on the gate and the second electrode of the drive transistor M0, so that the drive transistor M0 forms a diode electrical connection structure, the gate of the drive transistor M0 is charged through the data voltage Vda, and the voltage of the gate of the drive transistor M0 is made to successfully be Vda+Vth. The turned-on second reset transistor M4 provides the signal of the initialization signal line VINIT to the first electrode of the light emitting device L to initialize the first electrode of the light emitting device L. The voltage of the second electrode of the first compensation capacitor CF1 is the low voltage VGL of the low-level signal of the first scan line G1, and the voltage of the first electrode of the first compensation capacitor CF1 is Vda+Vth. Since S1=1, the first reset transistor M1 is turned off. Since EM=1, both the first light emitting control transistor M5 and the second light emitting control transistor M6 are turned off.

In the light emitting stage T3, S1=0, G2=0, G1=1, EM=0, and VS=0.

Since the second scan line G2 is switched from the high voltage VGH of the high-level signal to the low voltage VGL of the low-level signal, the voltage of the gate of the drive transistor M0 may be changed by a voltage ΔVn11 on the basis of Vda+Vth.

$$\Delta Vn11 = \frac{CgsT2}{CgsT2 + Cc1 + Cf1 + Co} * (VGL - VGH),$$

where CgsT2 represents the first channel capacitance value, Cc1 represents the capacitance value of the storage capacitor C1, Cf1 represents the capacitance value of the first compensation capacitor CF1, and Co represents other related capacitance values (generally being fixed values).

Since the first scan line G1 is switched from the low voltage VGL of the low-level signal to the high voltage VGH of the high-level signal, the voltage of the gate of the drive transistor M0 may be changed by a voltage ΔVn12 on the basis of Vda+Vth.

$$\Delta Vn12 = \frac{Cf1}{CgsT2 + Cc1 + Cf1 + Co} * (VGH - VGL).$$

Thus, the amount of change in the voltage of the gate of the drive transistor M0 is: ΔVn10=ΔVn11+ΔVn12. Since the difference between the capacitance value Cf1 of the first compensation capacitor CF1 and the first channel capacitance value CgsT2 satisfies 0±Δc1, it may be considered that the capacitance value Cf1 of the first compensation capacitor CF1 and the first channel capacitance value CgsT2 are equal. Therefore, ΔVn11 and ΔVn12 may cancel each other out, and ΔVn10 may be 0. In this way, after the light emitting stage T3, the voltage of the gate of the drive transistor M0 may be stabilized at Vda+Vth.

Since EM=0, the first light emitting control transistor M5 and the second light emitting control transistor M6 are both turned on. The turned-on first light emitting control transistor M5 provides the voltage of the first power end VDD to the first electrode of the drive transistor M0. The drive transistor M0 generates the operating current Ids under the action of the voltages of the gate and first electrode of the drive transistor M0. $Ids=K(Vdd-Vda)^2$, where K is a structural parameter. The turned-on second light emitting control transistor M6 turns on the second electrode of the drive transistor M0 and the first electrode of the light emitting device L, so that the light emitting device L is driven through the operating current Ids to emit light. Therefore, the operating current generated by the pixel circuit provided by the embodiment of the present disclosure has nothing to do with the threshold voltage Vth of the drive transistor M0.

Figure 8A:
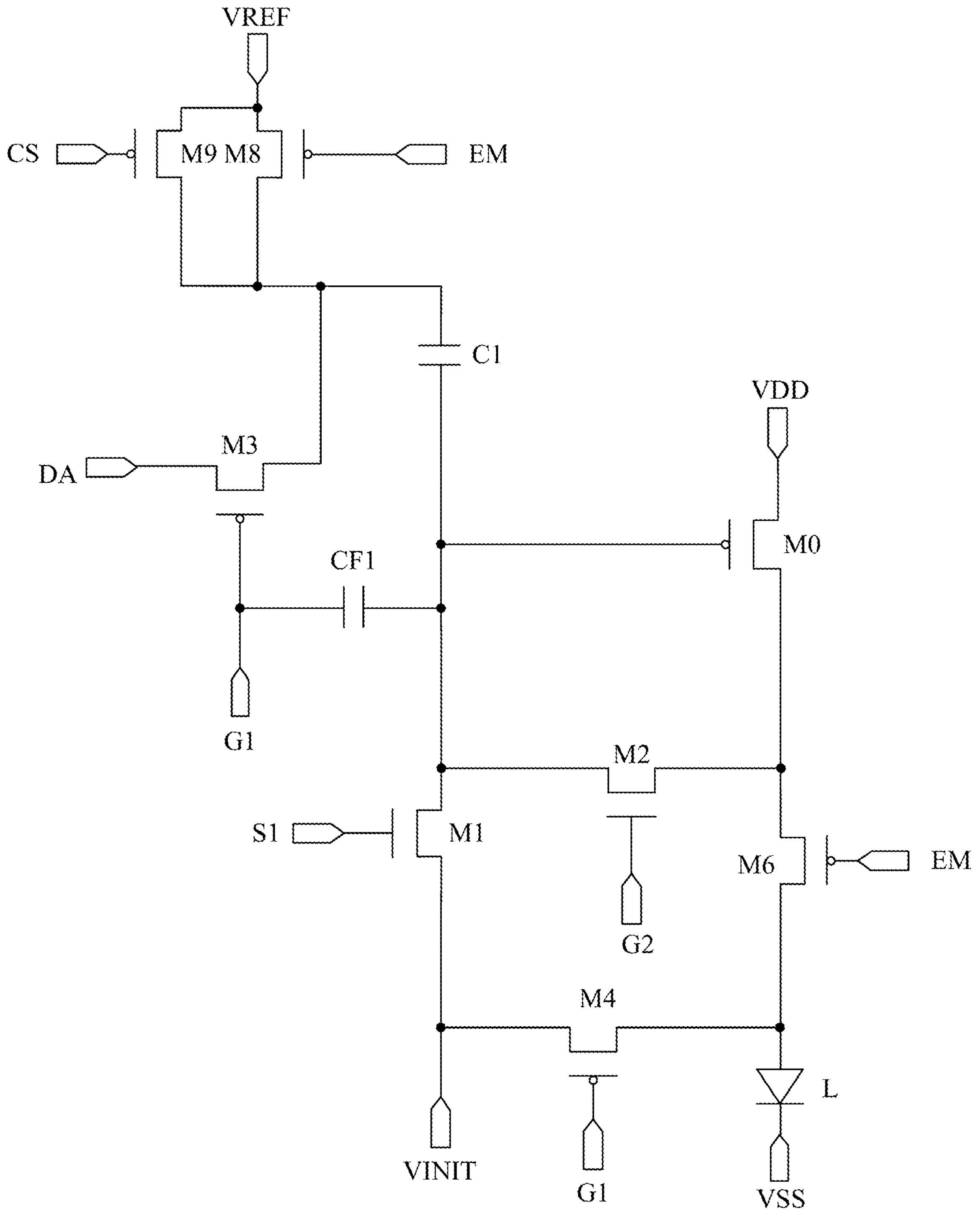
FIG. 8A is a schematic structural diagram of some other pixel circuits in an embodiment of the present disclosure.

The embodiment of the present disclosure further provides some pixel circuits. The schematic structural diagram of the pixel circuits is shown in FIG. 8A, which is modified in accordance with the implementation in the above-mentioned embodiment. The following only describes the differences between the present embodiment and the above-mentioned embodiment, and the similarities are not repeated here.

In some embodiments, in the embodiment of the present disclosure, as shown in FIG. 8A, the pixel circuit may include: the first reset transistor M1, the threshold compensation transistor M2, the data writing transistor M3, the second reset transistor M4, the second light emitting control transistor M6, a first reference transistor M8, a second reference transistor M9, the storage capacitor C1 and the first compensation capacitor CF1, the electrical connection relationship of which is shown in FIG. 8A, which will not be repeated here.

Figure 8B:
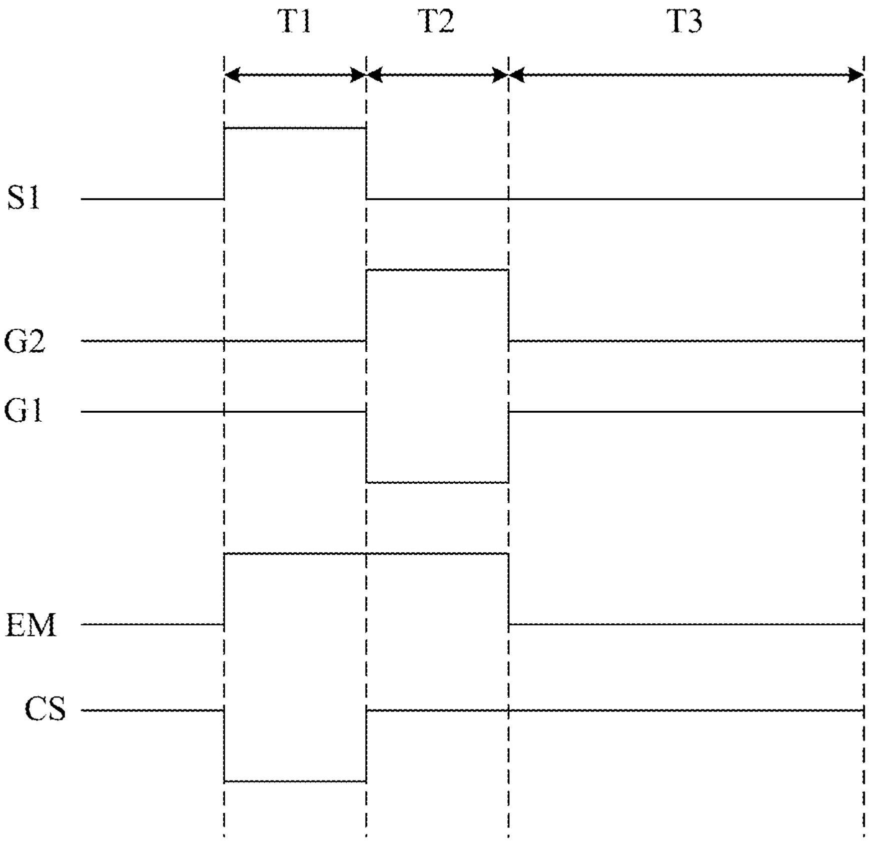
FIG. 8B is a signal timing diagram of some other pixel circuits in an embodiment of the present disclosure.

The operation of the pixel circuit provided by the embodiment of the present disclosure will now be described with reference to a signal timing diagram shown in FIG. 8B, taking the structure shown in FIG. 8A as an example. In the following description, the high level is denoted by 1, and the low level is denoted by 0. It should be noted that 1 and 0 are logic levels only to better explain the specific operation of the embodiment of the present disclosure, and not specific voltage values.

In the reset stage T1, S1=1, G2=0, G1=1, EM=1, and CS=0.

Since S1=1, the first reset transistor M1 is turned on to provide the signal of the initialization signal line VINIT to the gate of the drive transistor M0 to initialize the gate of the drive transistor M0. Since CS=0, the second reference transistor M9 is turned on to provide a signal of a reference signal end VREF to the storage capacitor C1. Since G2=0, the threshold compensation transistor M2 is turned off. Since G1=1, the data writing transistor M3 and the second reset transistor M4 are both turned off. Since EM=1, both the first reference transistor M8 and the second light emitting control transistor M6 are turned off. The voltage of the second electrode of the first compensation capacitor CF1 is the high voltage VGH of the high-level signal of the first scan line G1, and the voltage of the first electrode of the first compensation capacitor CF1 is the voltage Vinit of the initialization signal line VINIT.

In the data writing stage T2, S1=0, G2=1, G1=0, EM=1, and CS=1.

Since G1=0, the data writing transistor M3 and the second reset transistor M4 are both turned on. The turned-on data writing transistor M3 inputs the data voltage Vda of the data line DA to the storage capacitor C1. The turned-on second reset transistor M4 provides the signal of the initialization signal line VINIT to the first electrode of the light emitting device L to initialize the first electrode of the light emitting device L. Since G2=1, the threshold compensation transistor M2 is turned on. The turned-on threshold compensation transistor M2 turns on the gate and the second electrode of the drive transistor M0, so that the drive transistor M0 forms a diode electrical connection structure, the gate of the drive transistor M0 is charged through the first power end VDD, and the voltage of the gate of the drive transistor M0 is made to successfully be Vdd+Vth. The voltage of the second electrode of the first compensation capacitor CF1 is the low voltage VGL of the low-level signal of the first scan line G1, and the voltage of the first electrode of the first compensation capacitor CF1 is Vdd+Vth. Since S1=0, the first reset transistor M1 is turned off. Since EM=1, both the first reference transistor M8 and the second light emitting control transistor M6 are turned off. Vdd is the voltage of the first power end VDD.

In the light emitting stage T3, S1=0, G2=0, G1=1, and EM=0.

Since the second scan line G2 is switched from the high voltage VGH of the high-level signal to the low voltage VGL of the low-level signal, the voltage of the gate of the drive transistor M0 may be changed by a voltage ΔVn11 on the basis of Vda+Vth.

$$\Delta Vn11 = \frac{CgsT2}{CgsT2 + Cc1 + Cf1 + Co} * (VGL - VGH),$$

where CgsT2 represents the first channel capacitance value, Cc1 represents the capacitance value of the storage capacitor C1, Cf1 represents the capacitance value of the first compensation capacitor CF1, and Co represents other related capacitance values (generally being fixed values).

Since the first scan line G1 is switched from the low voltage VGL of the low-level signal to the high voltage VGH of the high-level signal, the voltage of the gate of the drive transistor M0 may be changed by a voltage ΔVn12 on the basis of Vda+Vth.

$$\Delta Vn12 = \frac{Cf1}{CgsT2 + Cc1 + Cf1 + Co} * (VGH - VGL).$$

Thus, the amount of change in the voltage of the gate of the drive transistor M0 is: ΔVn10=ΔVn11+ΔVn12. Since the difference between the capacitance value Cf1 of the first compensation capacitor CF1 and the first channel capacitance value CgsT2 satisfies 0±Δc1, it may be considered that the capacitance value Cf1 of the first compensation capacitor CF1 and the first channel capacitance value CgsT2 are equal. Therefore, ΔVn11 and ΔVn12 may cancel each other out, and ΔVn10 may be 0. In this way, after the light emitting stage T3, the voltage of the gate of the drive transistor M0 may be stabilized at Vda+Vth.

Since EM=0, the first reference transistor M8 and the second light emitting control transistor M6 are both turned on. The turned-on first reference transistor M8 provides the voltage of the reference signal end VREF to the storage capacitor C1, so that the voltage of the drive transistor M0 is changed into Vdd+Vth+Vda. Therefore, the drive transistor M0 generates the operating current Ids under the action of the voltages of the gate and first electrode of the drive transistor M0. $Ids=K(Vda)^2$, where K is a structural parameter. The turned-on second light emitting control transistor M6 turns on the second electrode of the drive transistor M0 and the first electrode of the light emitting device L, so that the light emitting device L is driven through the operating current Ids to emit light. Therefore, the operating current generated by the pixel circuit provided by the embodiment of the present disclosure has nothing to do with the threshold voltage Vth of the drive transistor M0 and the voltage of the first power end VDD.

Figure 9:
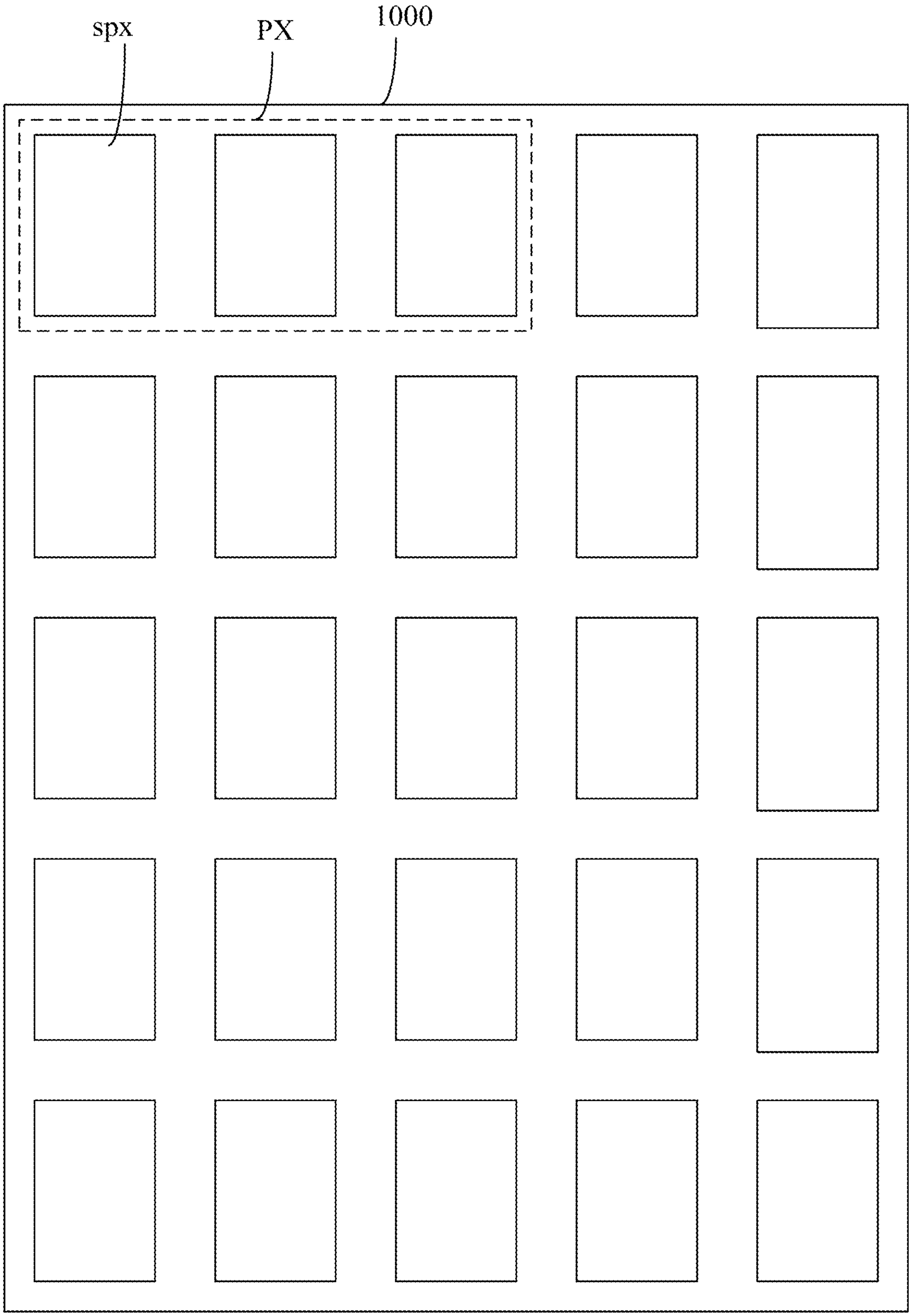
FIG. 9 is a schematic structural diagram of some display panels in an embodiment of the present disclosure.

An embodiment of the present disclosure also provides a display panel. As shown in FIG. 9, the display panel may include: a plurality of pixel units PX disposed in an array in a display region of a base substrate 1000. Each of the plurality of pixel units PX includes a plurality of sub-pixels spx. Exemplarily, each pixel unit may include a red sub-pixel, a green sub-pixel, and a blue sub-pixel. In this way, red, green and blue may be mixed to achieve color display. Or, each pixel unit may also include a red sub-pixel, a green sub-pixel, a blue sub-pixel, and a white sub-pixel. In this way, red, green, blue and white may be mixed to achieve color display. Of course, in actual applications, light emitting colors of the sub-pixels spx in the pixel units may be designed and determined according to the actual application environment, which is not limited here.

In some embodiments, in the embodiment of the present disclosure, each sub-pixel spx may include the above-mentioned pixel circuit. It should be noted that the structure and operation of the pixel circuit may be described with reference to the above-described embodiment, and will not be described in detail here. The structure of the pixel circuit shown in FIG. 2 is exemplified below.

Figure 10:
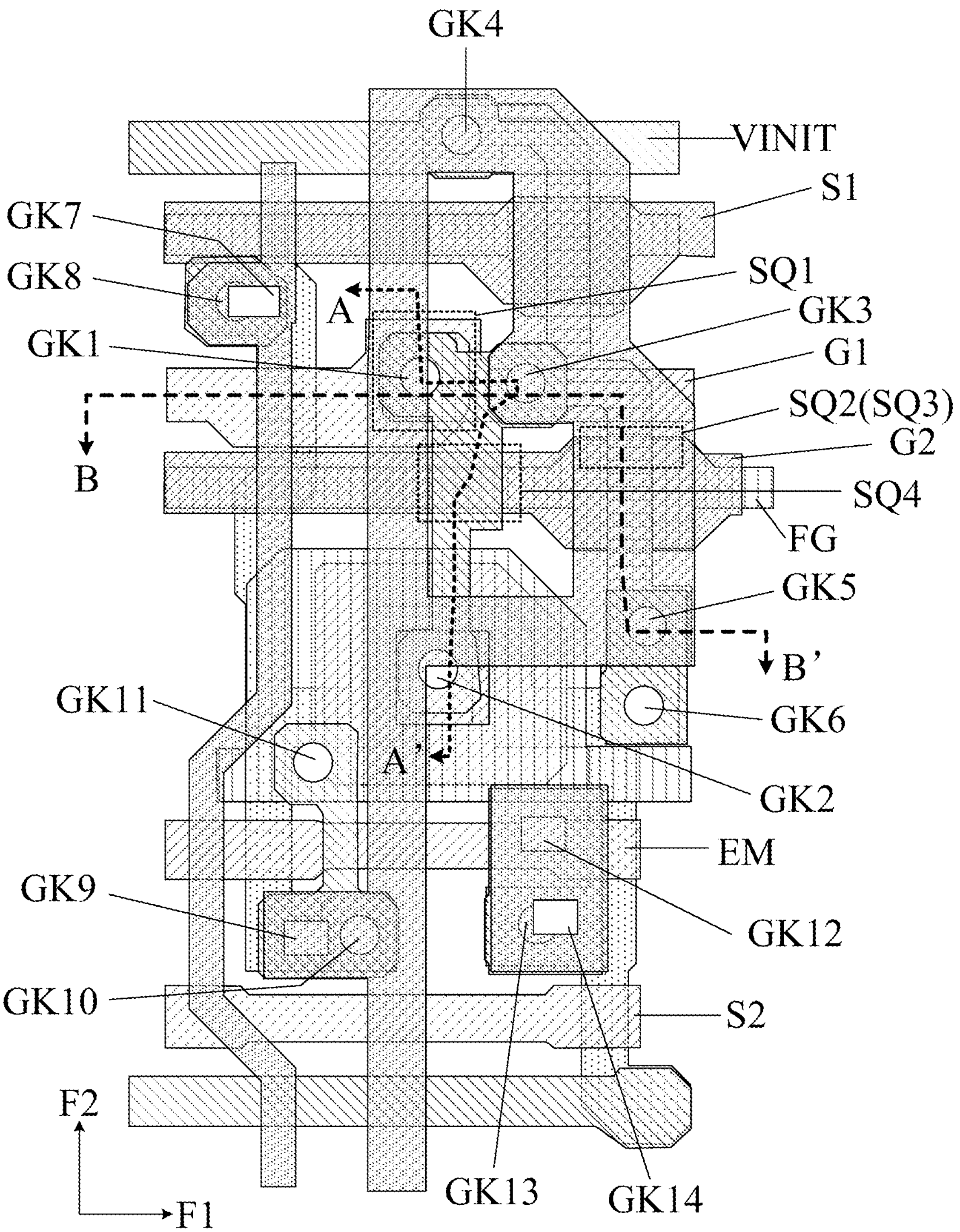
FIG. 10 is a schematic structural diagram of layout of pixel circuits in some display panels in an embodiment of the present disclosure.

FIG. 10 is a schematic structural diagram of layout of the pixel circuit in the display panel provided by some embodiments of the present disclosure on the base substrate 1000. FIGS. 11A to 11G are schematic diagrams of different layers of the pixel circuit provided by some embodiments of the present disclosure. FIG. 12 is a schematic cross-sectional structural diagram of the schematic structural diagram of the layout of the pixel circuit in the display panel shown in FIG. 10 on the base substrate 1000 in a direction AA'. FIG. 13 is a schematic cross-sectional structural diagram of the schematic structural diagram of the layout of the pixel circuit in the display panel shown in FIG. 10 on the base substrate 1000 in a direction BB'. The examples shown in FIGS. 10 to 11G take the pixel circuit in one sub-pixel spx as an example.

Figure 11A:
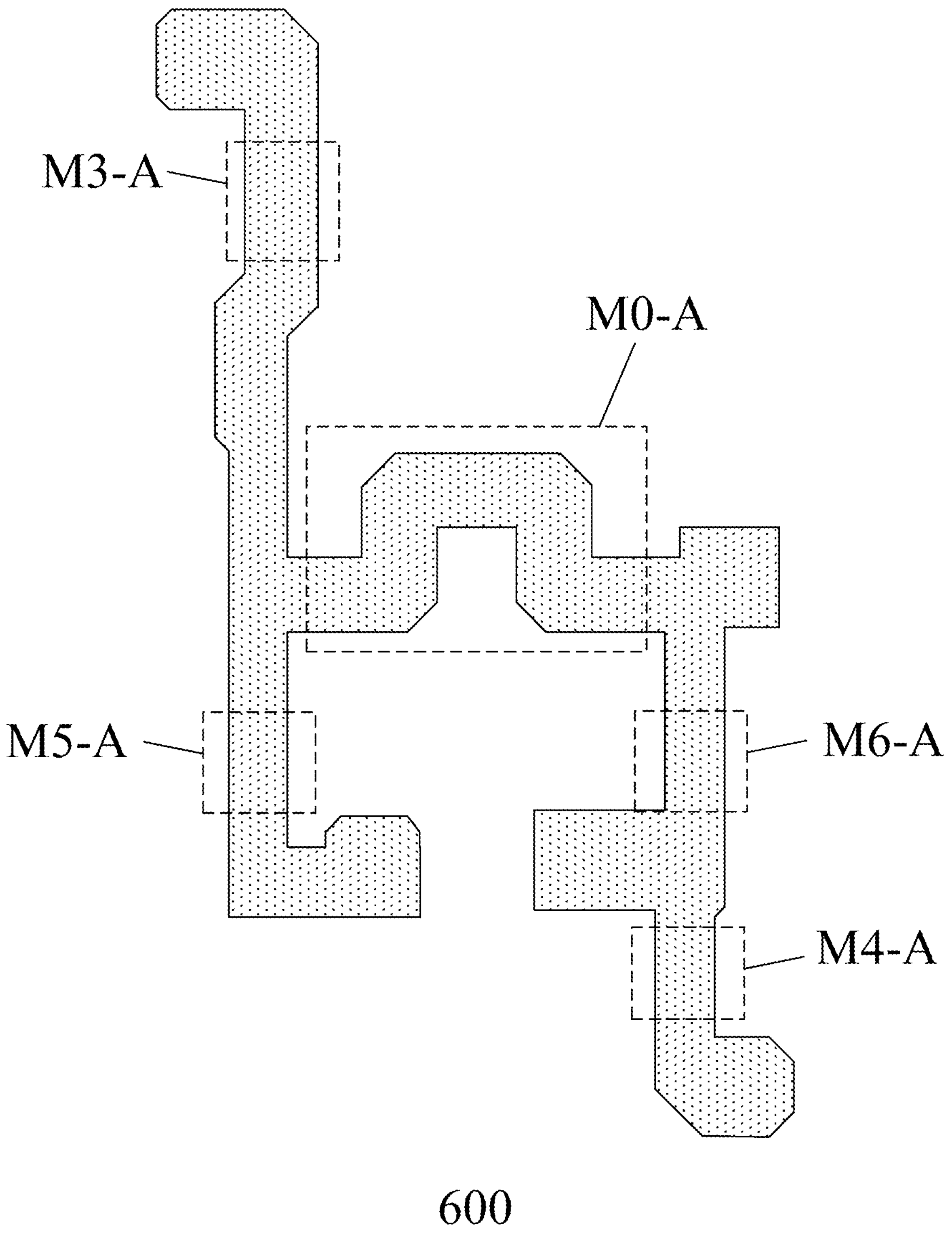
FIG. 11A is a schematic structural diagram of layout of silicon semiconductor layers in some display panels in an embodiment of the present disclosure.
Figure 12:
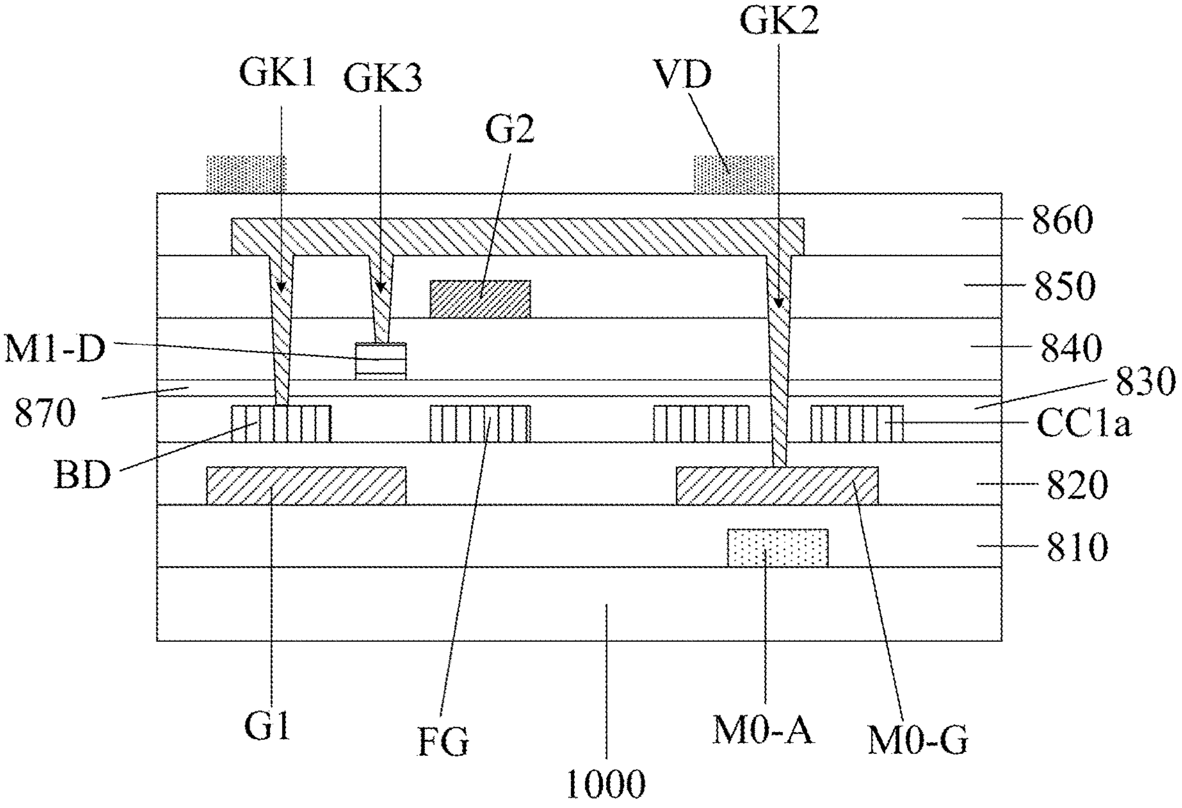
FIG. 12 is a cross-sectional structural diagram of the schematic structural diagram of the layout of the pixel circuits in the display panels shown in FIG. 10 in a direction AA'.
Figure 13:
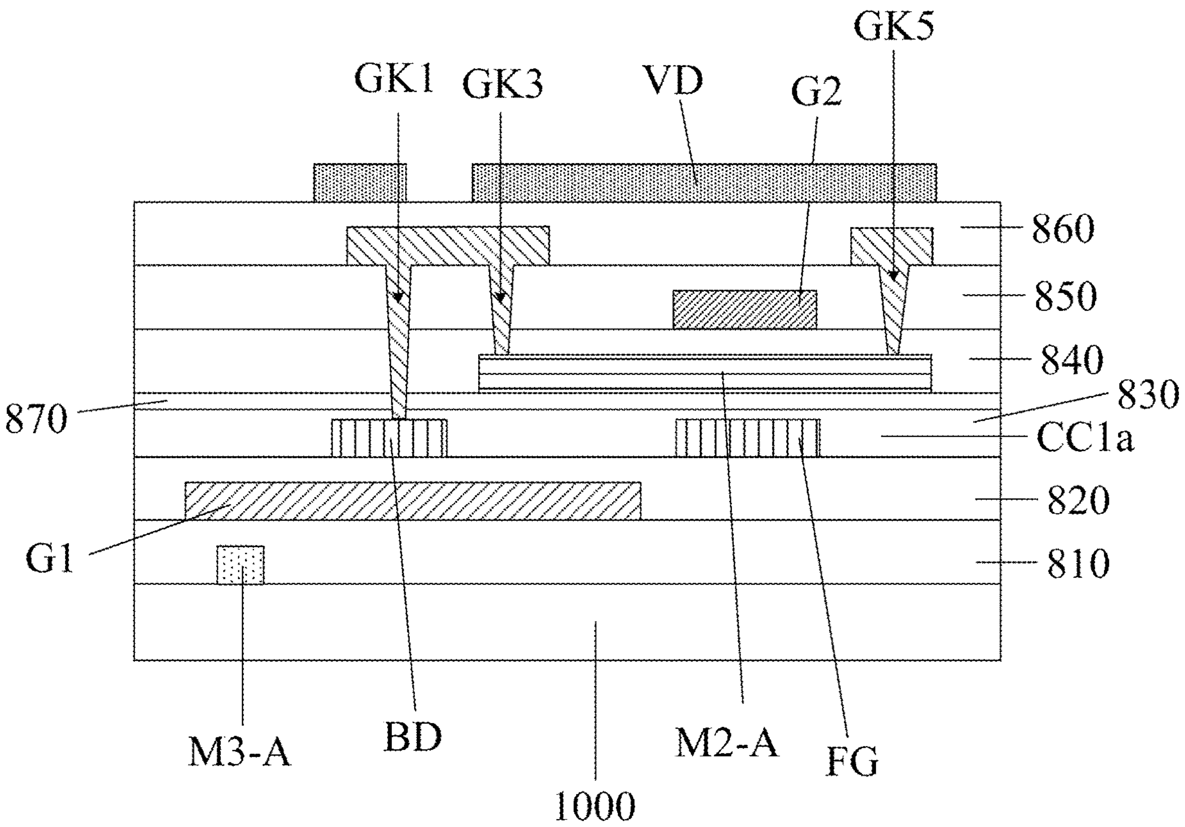
FIG. 13 is a cross-sectional structural diagram of the schematic structural diagram of the layout of the pixel circuits in the display panels shown in FIG. 10 in a direction BB'.

Exemplarily, as shown in FIGS. 10, 11A, 12, and 13, a silicon semiconductor layer 600 of the pixel circuit is shown. The silicon semiconductor layer 600 is located on the base substrate 1000. Exemplarily, the silicon semiconductor layer 600 may be formed by patterning a LTPS material. The silicon semiconductor layer 600 may be used to fabricate active layers of the drive transistor M0, the data writing transistor M3, the second reset transistor M4, the first light emitting control transistor M5, and the second light emitting control transistor M6. Also, each of the active layers of the drive transistor M0, the data writing transistor M3, the second reset transistor M4, the first light emitting control transistor M5, and the second light emitting control transistor M6 may include a first region, a second region, and a first channel region located between the first region and the second region. For example, FIG. 11A illustrates the first channel region M0-A of the drive transistor M0, the first channel region M3-A of the data writing transistor M3, the first channel region M4-A of the second reset transistor M4, the first channel region M5-A of the first light emitting control transistor M5, and the first channel region M6-A of the second light emitting control transistor M6. It should be noted that the above-mentioned first regions and second regions may be conductor regions formed by regions doped with n-type impurities or p-type impurities in the silicon semiconductor layer 600. Therefore, the first regions and the second regions may be used as source regions and drain regions of the active layers for electrical connection.

Exemplarily, a first gate insulating layer 810 is formed on a side, facing away from the base substrate 1000, of the silicon semiconductor layer 600; and used to protect the silicon semiconductor layer 600. Exemplarily, a thickness of the first gate insulating layer 810 may be 1000-1500 Å. For example, the thickness of the first gate insulating layer 810 may be 1000 Å, or 1300 Å, or 1500 Å, which is not limited here.

As shown in FIGS. 10, 11B, 12, and 13, a first conductive layer 100 of the pixel circuit is shown. The first conductive layer 100 is disposed on a side, facing away from the base substrate 1000, of the first gate insulating layer 810 so as to be insulated from the silicon semiconductor layer 600. The first conductive layer 100 may include: a plurality of first scan lines G1, a plurality of light emitting control lines EM, a plurality of second reset lines S2, gates M0-G of the drive transistors M0, gates M3-G of the data writing transistors M3, gates M4-G of the second reset transistors M4, gates M5-G of the first light emitting control transistors M5, and gates M6-G of the second light emitting control transistors M6. The plurality of first scan lines G1, the plurality of light emitting control lines EM and the plurality of second reset lines S2 are disposed at intervals.

Exemplarily, a thickness of the first conductive layer 100 may be 2000-3000 Å. For example, the thickness of the first conductive layer 100 may be 2000 Å, or 2500 Å, or 3000 Å, which is not limited here.

Figure 11B:
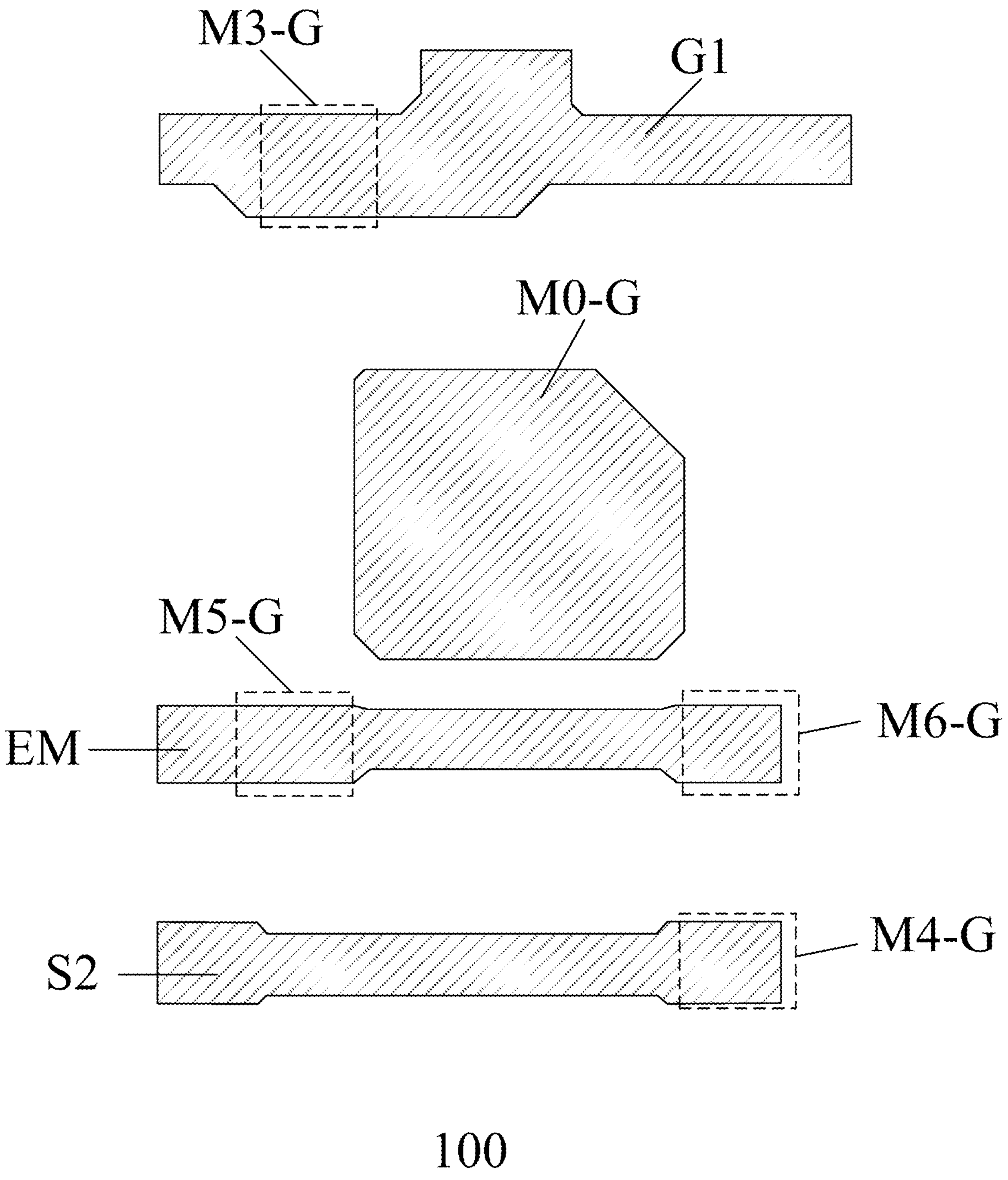
FIG. 11B is a schematic structural diagram of layout of first conductive layers in some display panels in an embodiment of the present disclosure.

Exemplarily, as shown in FIGS. 10 and 11B, one row of sub-pixels corresponds to one first scan line G1, one light emitting control line EM, and one second reset line S2. Exemplarily, the first scan line G1, the light emitting control line EM, and the second reset line S2 may extend substantially in a direction F1 and are disposed in a direction F2. The direction F1 may be a row direction of the sub-pixels, and the direction F2 may be a column direction of the sub-pixels. Or, the direction F1 may be the column direction of the sub-pixels, and the direction F2 may be the row direction of the sub-pixels.

Exemplarily, as shown in FIGS. 10 and 11B, the gate M3-G of the data writing transistor M3 may be a portion where the first scan line G1 overlaps the silicon semiconductor layer 600. The gate M4-G of the second reset transistor M4 may be a portion where the second reset line S2 overlaps the silicon semiconductor layer 600. The gate M5-G of the first light emitting control transistor M5 may be a first portion where the light emitting control line EM overlaps the silicon semiconductor layer 600. The gate M6-G of the second light emitting control transistor M6 may be a second portion where the light emitting control line EM overlaps the silicon semiconductor layer 600.

Exemplarily, as shown in FIGS. 10 and 11B, for the first scan line G1 and the data writing transistor corresponding to the same sub-pixel, an orthographic projection of the first scan line G1 on the base substrate 1000 and an orthographic projection of the active layer of the data writing transistor M3 on the base substrate 1000 have an overlapping region.

Exemplarily, as shown in FIGS. 10 and 11B, for the data writing transistor M3, an active layer of a threshold compensation transistor M2, and a compensation conductive part BD corresponding to the same sub-pixel, an orthographic projection of the compensation conductive part BD on the base substrate 1000 is located between the orthographic projection of the active layer of the data writing transistor M3 on the base substrate 1000 and an orthographic projection of a third via GK3 corresponding to the active layer of the threshold compensation transistor M2 on the base substrate 1000.

Exemplarily, as shown in FIGS. 10 and 11B, an orthographic projection of the gate M0-G of the drive transistor M0 on the base substrate 1000 is located between the orthographic projection of the first scan line G1 on the base substrate 1000 and an orthographic projection of the light emitting control line EM on the base substrate 1000. An orthographic projection of the second reset line S2 on the base substrate 1000 is located on a side, facing away from the gate M0-G of the drive transistor M0, of the orthographic projection of the light emitting control line EM on the base substrate 1000.

Exemplarily, a first interlayer dielectric layer 820 is formed on a side, facing away from the base substrate 1000, of the first conductive layer 100; and used to insulate the first conductive layer 100 from a second conductive layer 200. Exemplarily, a thickness of the first interlayer dielectric layer 820 may be 1000-1500 Å. For example, the thickness of the first interlayer dielectric layer 820 may be 1000 Å, or 1300 Å, or 1500 Å, which is not limited here.

As shown in FIGS. 10, 11C, 12, and 13, the second conductive layer 200 of the pixel circuit is shown. The second conductive layer 200 is disposed on a side, facing away from the base substrate 1000, of the first interlayer dielectric layer 820. The second conductive layer 200 may include a plurality of compensation conductive parts BD, a plurality of auxiliary scan lines FG, a plurality of auxiliary reset lines FS, and storage conductive parts CC1a which are disposed at intervals. Exemplarily, an orthographic projection of the storage conductive part CC1a on the base substrate 1000 and the orthographic projection of the gate M0-G of the drive transistor M0 on the base substrate 1000 at least partially overlap to form a storage capacitor C1. The storage conductive part CC1a serves as a first electrode of the storage capacitor C1, and the gate M0-G of the drive transistor M0 serves as a second electrode of the storage capacitor C1. Exemplarily, the distance between the first electrode and the second electrode of the storage capacitor C1 may be 1000-1500 Å. For example, the distance between the first electrode and the second electrode of the storage capacitor C1 may be 1000 Å, or 1200 Å, or 1300 Å, or 1400 Å, or 1500 Å, which is not limited here.

Exemplarily, a thickness of the second conductive layer 200 may be 2000-3000 Å. For example, the thickness of the second conductive layer 200 may be 2000 Å, or 2500 Å, or 3000 Å, which is not limited here.

Figure 11C:
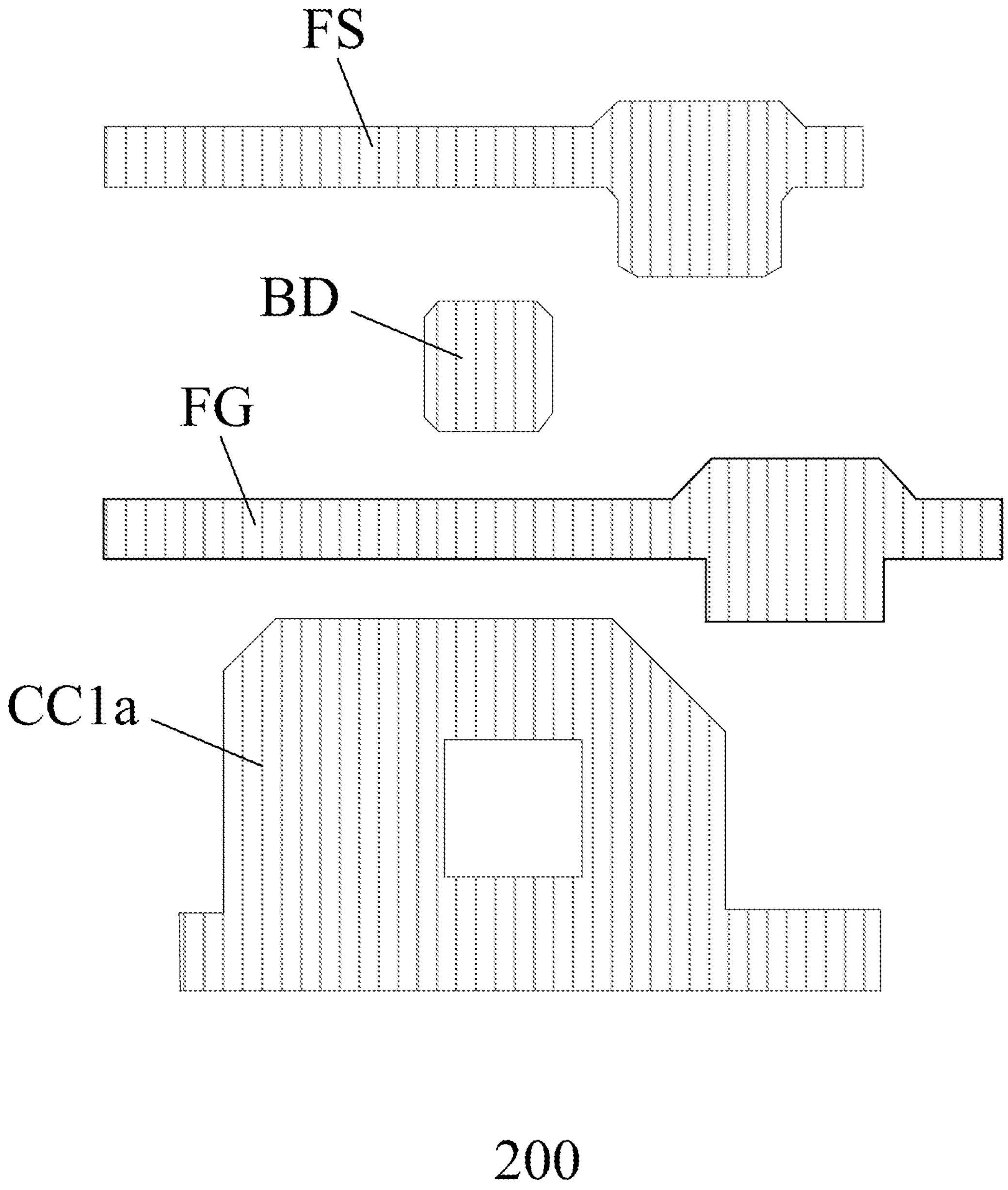
FIG. 11C is a schematic structural diagram of layout of second conductive layers in some display panels in an embodiment of the present disclosure.

Exemplarily, as shown in FIGS. 10 and 11C, one row of sub-pixels corresponds to one auxiliary scan line FG and one auxiliary reset line FS. Exemplarily, the auxiliary scan line FG and the auxiliary reset line FS may extend in the direction F1 and be disposed in the direction F2.

Exemplarily, as shown in FIGS. 10, 11C, 12, and 13, the sub-pixels may include the compensation conductive parts BD. In the same sub-pixel, the compensation conductive part BD is electrically connected with the gate M0-G of the drive transistor M0. For the first scan line G1 and the compensation conductive part BD corresponding to the same sub-pixel, the orthographic projection of the first scan line G1 on the base substrate 1000 and the orthographic projection of the compensation conductive part BD on the base substrate 1000 have a first overlapping region SQL A first compensation capacitor CF1 is located in the first overlapping region SQ1, and formed by an overlapping portion between the first scan line G1 and the compensation conductive part BD. The first scan line G1 located in the first overlapping region SQ1 serves as a second electrode of the first compensation capacitor CF1, and the compensation conductive part BD located in the first overlapping region SQ1 serves as a first electrode of the first compensation capacitor CF1. Exemplarily, the distance between the first electrode of the first compensation capacitor CF1 and the second electrode of the first compensation capacitor CF1 may be 1000-1500 Å. For example, the distance between the first electrode of the first compensation capacitor CF1 and the second electrode of the first compensation capacitor CF1 may be 1000 Å, or 1200 Å, or 1300 Å, or 1400 Å, or 1500 Å, which is not limited here.

Exemplarily, as shown in FIGS. 10 and 11C, for the first scan line G1 and the compensation conductive part BD corresponding to the same sub-pixel, the orthographic projection of the first scan line G1 on the base substrate 1000 covers the orthographic projection of the compensation conductive part BD on the base substrate 1000.

Exemplarily, a second interlayer dielectric layer 830 is formed on a side, facing away from the base substrate 1000, of the second conductive layer 200; and used to insulate an oxide semiconductor layer 700 from the second conductive layer 200. As shown in FIGS. 10, 11D, 12, and 13, the oxide semiconductor layer 700 of the pixel circuit is shown. The oxide semiconductor layer 700 is located on a side, facing away from the base substrate 1000, of the second interlayer dielectric layer 830. The oxide semiconductor layer 700 includes an active layer of a first reset transistor M1 and the active layer of the threshold compensation transistor M2.

Exemplarily, a thickness of the second interlayer dielectric layer 830 may be 900-1500 Å. For example, the thickness of the second interlayer dielectric layer 830 may be 900 Å, or 1200 Å, or 1500 Å, which is not limited here.

Exemplarily, as shown in FIGS. 10, 11D, 12, and 13, a buffer layer 870 is formed on the side, facing away from the base substrate 1000, of the second interlayer dielectric layer 830; and the oxide semiconductor layer 700 is formed on a side, facing away from the base substrate 1000, of the buffer layer 870. Exemplarily, a material of the buffer layer 870 may be silicon oxide, and a material of the second interlayer dielectric layer 830 may be silicon nitride. Since the features of the material in the oxide semiconductor layer 700 may be affected by direct contact of the oxide semiconductor layer 700 and the silicon nitride, through disposing the buffer layer 870 between the second interlayer dielectric layer 830 and the oxide semiconductor layer 700 according to the embodiment of the present disclosure, the oxide semiconductor layer 700 and the silicon nitride may be prevented from making direct contact, and the silicon nitride is prevented from affecting the features of the material of the oxide semiconductor layer 700. Of course, the material of the second interlayer dielectric layer 830 and the material of the buffer layer 870 may also be both set as silicon oxide.

Exemplarily, a thickness of the buffer layer 870 may be 2000-3000 Å. For example, the thickness of the buffer layer 870 may be 2000 Å, or 2500 Å, or 3000 Å, which is not limited here.

Exemplarily, a thickness of the oxide semiconductor layer 700 may be 300-600 Å. For example, the thickness of the oxide semiconductor layer 700 may be 300 Å, or 500 Å, or 600 Å, which is not limited here.

Figure 11D:
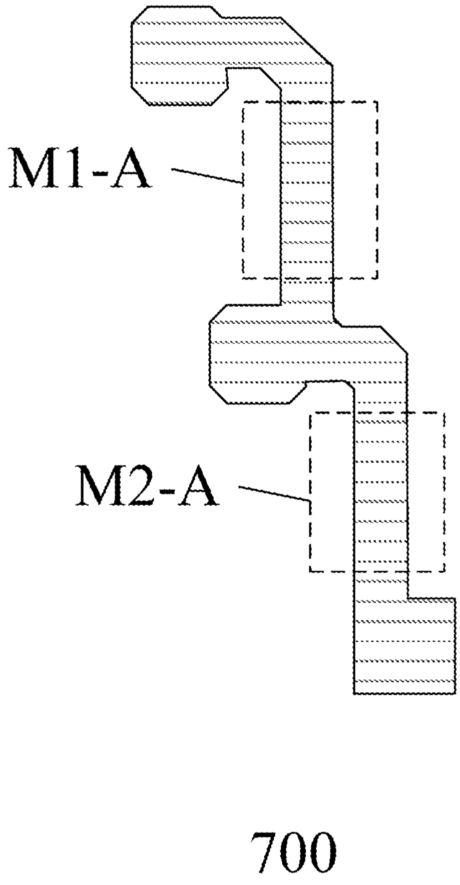
FIG. 11D is a schematic structural diagram of layout of oxide semiconductor layers in some display panels in an embodiment of the present disclosure.

In addition, each of the active layer of the first reset transistor M1 and the active layer of the threshold compensation transistor M2 may include a third region, a fourth region, and a second channel region located between the third region and the fourth region. For example, FIG. 11D illustrates the second channel region M1-A of the active layer of the first reset transistor M1, and the second channel region M2-A of the active layer of the threshold compensation transistor M2. It should be noted that the third regions and the fourth regions may be conductor regions formed by regions doped with n-type impurities or p-type impurities in the oxide semiconductor layer 700. Therefore, the third regions and the fourth regions may be used as source regions and drain regions of the active layers for electrical connection.

In addition, as shown in FIGS. 10, 11D, 12, and 13, the active layer of the first reset transistor M1 and the active layer of the threshold compensation transistor M2 may be an integrated structure. Exemplarily, the fourth region M1-D of the active layer of the first reset transistor M1 and the fourth region of the active layer of the threshold compensation transistor M2 are shared.

Exemplarily, a second gate insulating layer 840 is formed on a side, facing away from the base substrate 1000, of the oxide semiconductor layer 700. A third conductive layer 300 is formed on a side, facing away from the base substrate 1000, of the second gate insulating layer 840. As shown in FIGS. 10, 11E, 12, and 13, the third conductive layer 300 of the pixel circuit is shown. The third conductive layer 300 may include a plurality of second scan lines G2 and a plurality of first reset lines S1 disposed at intervals. One row of sub-pixels corresponds to one second scan line G2 and one first reset line S1.

Exemplarily, a thickness of the second gate insulating layer 840 may be 1000-2000 Å. For example, the thickness of the second gate insulating layer 840 may be 1000 Å, or 1500 Å or 2000 Å, which is not limited here.

Exemplarily, a thickness of the third conductive layer 300 may be 2000-3000 Å. For example, the thickness of the third conductive layer 300 may be 2000 Å, or 2500 Å, or 3000 Å, which is not limited here.

Figure 11E:
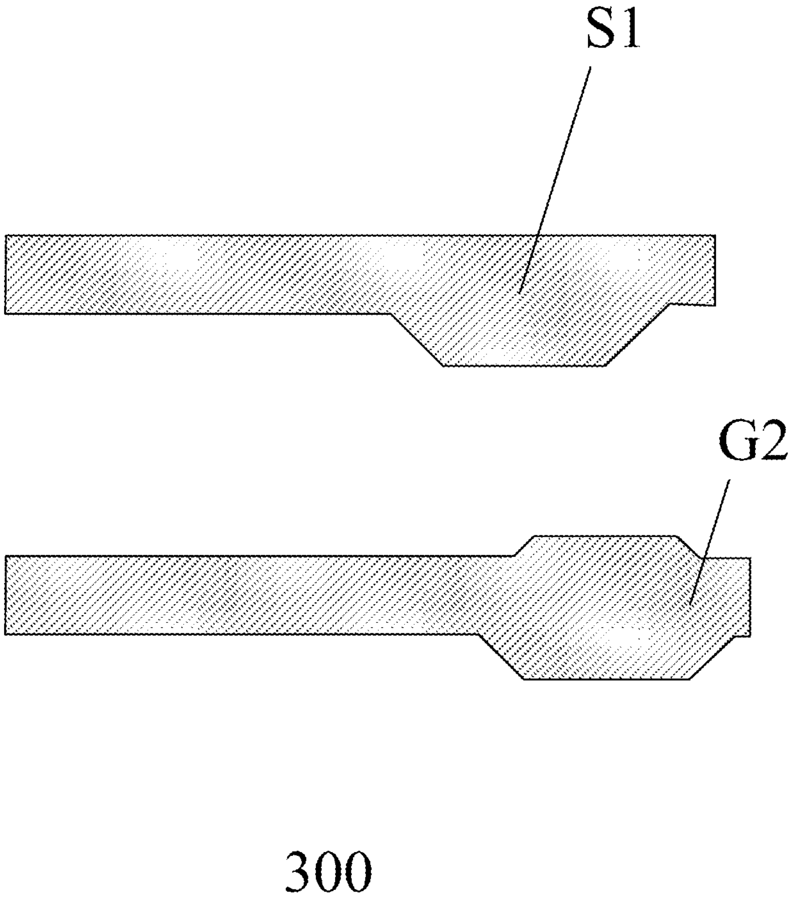
FIG. 11E is a schematic structural diagram of layout of third conductive layers in some display panels in an embodiment of the present disclosure.

As shown in FIGS. 10 and 11E, for the second scan line G2 and the threshold compensation transistor M2 corresponding to the same sub-pixel, the orthographic projection of the active layer of the threshold compensation transistor M2 on the base substrate 1000 and the orthographic projection of the second scan line G2 on the base substrate 1000 have a second overlapping region SQ2. A first part of capacitor of a channel capacitor of the threshold compensation transistor M2 is located in the second overlapping region SQ2, and formed by an overlapping portion between the second scan line G2 and the active layer of the threshold compensation transistor M2. For example, an orthographic projection of the fourth region of the active layer of the threshold compensation transistor M2 on the base substrate 1000 and the orthographic projection of the second scan line G2 on the base substrate 1000 have a second overlapping region SQ2. The first part of capacitor of the channel capacitor of the threshold compensation transistor M2 is located in the second overlapping region SQ2, and formed by an overlapping portion between the second scan line G2 and the fourth region of the active layer of the threshold compensation transistor M2.

Exemplarily, as shown in FIGS. 10 and 11E, for the auxiliary scan line FG and the threshold compensation transistor M2 corresponding to the same sub-pixel, an orthographic projection of the auxiliary scan line FG on the base substrate 1000 and the orthographic projection of the active layer of the threshold compensation transistor M2 on the base substrate 1000 have a third overlapping region SQ3. A second part of capacitor of the channel capacitor of the threshold compensation transistor M2 is located in the third overlapping region SQ3, and formed by an overlapping portion between the auxiliary scan line FG and the active layer of the threshold compensation transistor M2. For example, the orthographic projection of the auxiliary scan line FG on the base substrate 1000 and the orthographic projection of the fourth region of the active layer of the threshold compensation transistor M2 on the base substrate 1000 have a third overlapping region SQ3. The channel capacitor of the threshold compensation transistor M2 further includes the auxiliary scan line FG and the fourth region of the active layer of the threshold compensation transistor M2 in the third overlapping region SQ3. Exemplarily, the third overlapping region SQ3 may overlap the second overlapping region SQ2.

Exemplarily, as shown in FIGS. 10 and 11E, for the threshold compensation transistor M2 and the second scan line G2 corresponding to the same sub-pixel, the orthographic projection of the second scan line G2 on the base substrate 1000 and the orthographic projection of the active layer of the threshold compensation transistor M2 on the base substrate 1000 have the overlapping region. In addition, for the threshold compensation transistor M2 and the auxiliary scan line FG corresponding to the same sub-pixel, the orthographic projection of the auxiliary scan line FG on the base substrate 1000 and the orthographic projection of the active layer of the threshold compensation transistor M2 on the base substrate 1000 have the overlapping region. Further, for the threshold compensation transistor M2 and the second scan line G2 corresponding to the same sub-pixel, the orthographic projection of the second scan line G2 on the base substrate 1000 and an orthographic projection of the channel region of the active layer of the threshold compensation transistor M2 on the base substrate 1000 have an overlapping region. In addition, for the threshold compensation transistor M2 and the auxiliary scan line FG corresponding to the same sub-pixel, the orthographic projection of the auxiliary scan line FG on the base substrate 1000 and the orthographic projection of the channel region of the active layer of the threshold compensation transistor M2 on the base substrate 1000 have an overlapping region. In this way, the threshold compensation transistor M2 may form a double gate structure. As a result, an on-state current of the threshold compensation transistor M2 may be increased, thereby increasing the driving capability of the threshold compensation transistor M2, and improving the transistor features of the threshold compensation transistor M2.

In addition, the orthographic projection of the second scan line G2 on the base substrate 1000 and the orthographic projection of the channel region of the active layer of the threshold compensation transistor M2 on the base substrate 1000 have the overlapping region, and the orthographic projection of the auxiliary scan line FG on the base substrate 1000 and the orthographic projection of the channel region of the active layer of the threshold compensation transistor M2 on the base substrate 1000 have the overlapping region. In this way, light may be shielded through the second scan line G2 and the auxiliary scan line FG, thereby preventing ambient light from being incident on the channel region of the active layer of the threshold compensation transistor M2 through upper and lower sides of the display panel.

Exemplarily, as shown in FIGS. 10 and 11E, for the second scan line G2 and the auxiliary scan line FG corresponding to the same sub-pixel, the orthographic projection of the second scan line G2 on the base substrate 1000 overlaps the orthographic projection of the auxiliary scan line FG on the base substrate 1000. Further, for the second scan line G2 and the auxiliary scan line FG corresponding to the same sub-pixel, the second scan line G2 and the auxiliary scan line FG are electrically connected on a peripheral region of the base substrate 1000.

Exemplarily, as shown in FIGS. 10 and 11E, for the first reset transistor M1 and the first reset line S1 corresponding to the same sub-pixel, an orthographic projection of the first reset line S1 on the base substrate 1000 and an orthographic projection of the active layer of the first reset transistor M1 on the base substrate 1000 have an overlapping region. In addition, for the first reset transistor M1 and the auxiliary reset line FS corresponding to the same sub-pixel, an orthographic projection of the auxiliary reset line FS on the base substrate 1000 and the orthographic projection of the active layer of the first reset transistor M1 on the base substrate 1000 have an overlapping region. Further, for the first reset transistor M1 and the first reset line S1 corresponding to the same sub-pixel, the orthographic projection of the first reset line S1 on the base substrate 1000 and an orthographic projection of the channel region of the active layer of the first reset transistor M1 on the base substrate 1000 have an overlapping region. In addition, for the first reset transistor M1 and the auxiliary reset line FS corresponding to the same sub-pixel, the orthographic projection of the auxiliary reset line FS on the base substrate 1000 and the orthographic projection of the channel region of the active layer of the first reset transistor M1 on the base substrate 1000 have an overlapping region. In this way, the first reset transistor M1 may form a double gate structure. As a result, an on-state current of the first reset transistor M1 may be increased, thereby increasing the driving capability of the first reset transistor M1, and improving the transistor features of the first reset transistor M1.

In addition, the orthographic projection of the first reset line S1 on the base substrate 1000 and the orthographic projection of the channel region of the active layer of the first reset transistor M1 on the base substrate 1000 have the overlapping region, and the orthographic projection of the auxiliary reset line FS on the base substrate 1000 and the orthographic projection of the channel region of the active layer of the first reset transistor M1 on the base substrate 1000 have the overlapping region. In this way, light may also be shielded through the first reset line S1 and the auxiliary reset line FS, thereby preventing the ambient light from being incident on the channel region of the active layer of the first reset transistor M1 through the upper and lower sides of the display panel.

Exemplarily, as shown in FIGS. 10 and 11E, for the first reset line S1 and the auxiliary reset line FS corresponding to the same sub-pixel, the orthographic projection of the first reset line S1 on the base substrate 1000 overlaps the orthographic projection of the auxiliary reset line FS on the base substrate 1000. Further, for the first reset line S1 and the auxiliary reset line FS corresponding to the same sub-pixel, the first reset line S1 and the auxiliary reset line FS are electrically connected on a peripheral region of the base substrate 1000.

Exemplarily, as shown in FIGS. 10 and 11E, for the first scan line G1, the second scan line G2, and the first reset line S1 corresponding to the same sub-pixel, the orthographic projection of the first scan line G1 on the base substrate 1000 is located between the orthographic projections of the second scan line G2 and the first reset line S1 on the base substrate 1000.

Exemplarily, a third interlayer dielectric layer 850 is formed on a side, facing away from the base substrate 1000, of the third conductive layer; and a fourth conductive layer 400 is formed on a side, facing away from the base substrate 1000, of the third interlayer dielectric layer 850. As shown in FIGS. 10, 11F, 12, and 13, the fourth conductive layer 400 of the pixel circuit is shown. The fourth conductive layer 400 may include a plurality of first connection parts LB1, a plurality of second connection parts LB2, a plurality of third connection parts LB3, a plurality of fourth connection parts LB4, a plurality of fifth connection parts LB5 and a plurality of initialization signal lines VINIT which are disposed at intervals. A sub-pixel may include one first connection part LB1, one second connection part LB2, one third connection part LB3, one fourth connection part LB4, one fifth connection part LB5, and one initialization signal line VINIT.

Exemplarily, a thickness of the third interlayer dielectric layer 850 may be 5000-6000 Å. For example, the thickness of the third interlayer dielectric layer 850 may be 5000 Å, or 5500 Å, or 6000 Å, which is not limited here.

Exemplarily, a thickness of the fourth conductive layer 400 may be 6000-8000 Å. For example, the thickness of the fourth conductive layer 400 may be 6000 Å, or 7000 Å, or 8000 Å, which is not limited here.

Exemplarily, as shown in FIGS. 10, 11F, 12, and 13, a first end of the first connection part LB1 is electrically connected with the compensation conductive part BD through a first via GK1. A second end of the first connection part LB1 is electrically connected with the gate of the drive transistor through a second via GK2. A third end of the first connection part LB1 is electrically connected with the conductor region of the active layer of the threshold compensation transistor M2 through the third via GK3. In addition, the first via GK1 penetrates the third interlayer dielectric layer 850, the second gate insulating layer 840, and the second interlayer dielectric layer 830. The second via GK2 penetrates the third interlayer dielectric layer 850, the second gate insulating layer 840, the second interlayer dielectric layer 830, and the first interlayer dielectric layer 820. The third via GK3 penetrates the second gate insulating layer 840 and the third interlayer dielectric layer 850.

Exemplarily, as shown in FIGS. 10, 11F, 12, and 13, for the first scan line G1 and the third via GK3 corresponding to the same sub-pixel, the orthographic projection of the first scan line G1 on the base substrate 1000 covers the orthographic projection of the third via GK3 on the base substrate 1000.

Exemplarily, as shown in FIGS. 10, 11F, 12, and 13, the first end and the third end of the first connection part LB1 extend substantially in the same direction, namely the direction F1; and the first end, the second end and the third end of the first connection part LB1 substantially form a “T” shape. It should be noted that in the actual manufacturing process, due to process errors, the first end, the second end, and the third end of the first connection part LB1 may substantially form the “T” shape.

Exemplarily, as shown in FIGS. 10, 11F, 12, and 13, for the same sub-pixel, the orthographic projection of the second scan line G2 on the base substrate 1000 and an orthographic projection of the first connection part LB1 on the base substrate 1000 have a fourth overlapping region SQ4. The fourth overlapping region SQ4 has an auxiliary capacitor formed by an overlapping portion between the second scan line G2 and the first connection part LB1. In addition, a capacitance value of the auxiliary capacitor is substantially Act. It should be noted that due to the limitation of process conditions or other factors, the capacitance value of the auxiliary capacitor may not be equal to Act, and there may be some deviations. Therefore, the capacitance value of the auxiliary capacitor may satisfy the above-mentioned conditions substantially, which all belong to the protection scope of the present disclosure.

Figure 11F:
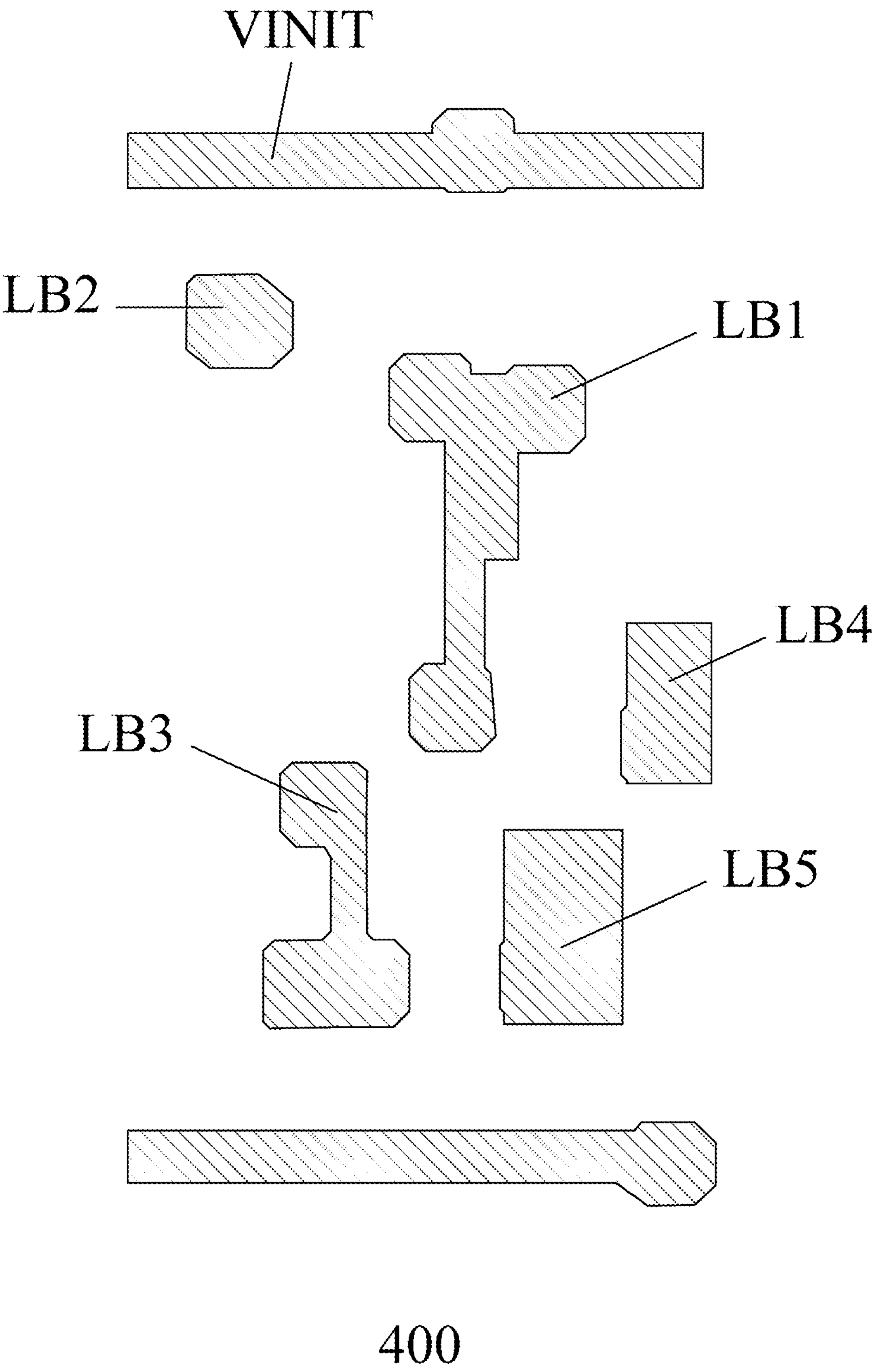
FIG. 11F is a schematic structural diagram of layout of fourth conductive layers in some display panels in an embodiment of the present disclosure.
Figure 11G:
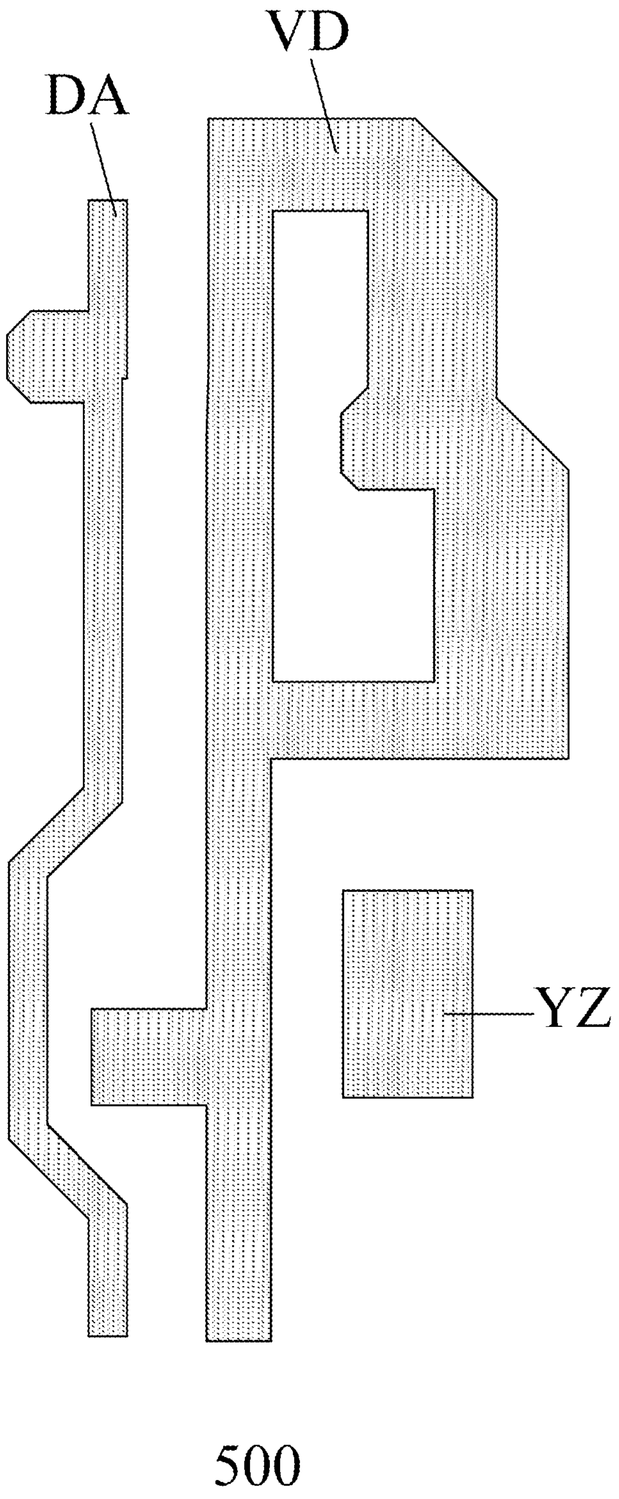
FIG. 11G is a schematic structural diagram of layout of fifth conductive layers in some display panels in an embodiment of the present disclosure.

Exemplarily, as shown in FIGS. 10 and 11F, the initialization signal line VINIT is electrically connected with the conductor region of the active layer of the first reset transistor M1 through a fourth via GK4. The fourth via GK4 penetrates the second gate insulating layer 840 and the third interlayer dielectric layer 850.

Exemplarily, as shown in FIGS. 10 and 11F, a first end of the fourth connection part LB4 is electrically connected with a semiconductor layer (for example, the third region) of the active layer of the threshold compensation transistor M2 through a fifth via GK5, and a second end of the fourth connection part LB4 is electrically connected with a semiconductor layer (for example, the second region) of the active layer of the drive transistor M0 through a sixth via GK6. The fifth via GK5 penetrates the second gate insulating layer 840 and the third interlayer dielectric layer 850. The sixth via GK6 penetrates the third interlayer dielectric layer 850, the second gate insulating layer 840, the second interlayer dielectric layer 830, the first interlayer dielectric layer 820, and the first gate insulating layer 810.

Exemplarily, as shown in FIGS. 10, 11G, 12, and 13, an interlayer insulating layer 860 is formed on a side, facing away from the base substrate 1000, of the fourth conductive layer 400; and a fifth conductive layer 500 is formed on a side, facing away from the base substrate 1000, of the interlayer insulating layer 860. As shown in FIGS. 10, 11G, 12, and 13, the fifth conductive layer 500 of the pixel circuit is shown. The fifth conductive layer 500 may include a plurality of data lines DA, a plurality of first power signal lines VD, and a plurality of anode switch parts YZ which are disposed at intervals. A sub-pixel includes one anode switch part YZ, and one column of sub-pixels corresponds to one data line DA and one first power signal line VD.

Exemplarily, a thickness of the interlayer insulating layer 860 may be 15000-30000 Å. For example, the thickness of the interlayer insulating layer 860 may be 15000 Å, or 20000 Å, or 30000 Å, which is not limited here.

Exemplarily, a thickness of the fifth conductive layer 500 may be 6000-8000 Å. For example, the thickness of the fifth conductive layer 500 may be 6000 Å, or 7000 Å, or 8000 Å, which is not limited here.

Exemplarily, as shown in FIGS. 10, 11F, and 11G, for one sub-pixel, the data line DA is electrically connected with the second connection part LB2 through a seventh via GK7, and the second connection part LB2 is electrically connected with the conductor region (for example, the first region) of the active layer of the data writing transistor M3 through an eighth via GK8. The seventh via GK7 penetrates the interlayer insulating layer 860. The eighth via GK8 penetrates the third interlayer dielectric layer 850, the second gate insulating layer 840, the second interlayer dielectric layer 830, the first interlayer dielectric layer 820, and the first gate insulating layer 810. Exemplarily, an orthographic projection of the data line DA on the base substrate 1000 covers an orthographic projection of the second connection part LB2 electrically connected with the data line DA on the base substrate 1000.

Exemplarily, as shown in FIGS. 10, 11F, and 11G, the first power signal line VD is electrically connected with a first end of the third connection part LB3 through a ninth via GK9, a second end of the third connection part LB3 is electrically connected with the conductor region (for example, the first region) of the active layer of the first light emitting control transistor M5 through a tenth via GK10, and a third end of the third connection part LB3 is electrically connected with the storage conductive part CC1a through an eleventh via GK11. That is, the first power signal line VD is electrically connected with a first power end to transmit a voltage to the first power end. The ninth via GK9 penetrates the interlayer insulating layer 860. The tenth via GK10 penetrates the third interlayer dielectric layer 850, the second gate insulating layer 840, the second interlayer dielectric layer 830, the first interlayer dielectric layer 820, and the first gate insulating layer 810. The eleventh via GK11 penetrates the interlayer insulating layer 860, the third interlayer dielectric layer 850, the second gate insulating layer 840, and the second interlayer dielectric layer 830.

Exemplarily, as shown in FIGS. 10, 11F, and 11G, the first end and the second end of the third connection part LB3 extend substantially in the direction F1; and the first end, the second end and the third end of the third connection part LB3 substantially form an inverted "T" shape. It should be noted that in the actual manufacturing process, due to process errors, the first end, the second end, and the third end of the third connection part LB3 may substantially form the inverted "T" shape.

Exemplarily, as shown in FIGS. 10, 11D, and 11G, for the first power signal line VD and the threshold compensation transistor M2 corresponding to the same sub-pixel, an orthographic projection of the first power signal line VD on the base substrate 1000 and the orthographic projection of the active layer of the threshold compensation transistor M2 on the base substrate 1000 have an overlapping region. Further, for the first power signal line VD and the threshold compensation transistor M2 corresponding to the same sub-pixel, the orthographic projection of the first power signal line VD on the base substrate 1000 covers the orthographic projection of the active layer of the threshold compensation transistor M2 on the base substrate 1000.

Exemplarily, as shown in FIGS. 10, 11D, and 11G, for the first power signal line VD and the first reset transistor M1 corresponding to the same sub-pixel, the orthographic projection of the first power signal line VD on the base substrate 1000 and the orthographic projection of the active layer of the first reset transistor M1 on the base substrate 1000 have an overlapping region. Further, for the first power signal line VD and the first reset transistor M1 corresponding to the same sub-pixel, the orthographic projection of the first power signal line VD on the base substrate 1000 covers the orthographic projection of the active layer of the first reset transistor M1 on the base substrate 1000.

Further, for the first power signal line VD, the threshold compensation transistor M2 and the first reset transistor M1 corresponding to the same sub-pixel, the orthographic projection of the first power signal line VD on the base substrate 1000 covers the orthographic projections of the active layers of the threshold compensation transistor M2 and the first reset transistor M1 on the base substrate 1000.

Exemplarily, as shown in FIGS. 10, 11D, and 11G, for the first power signal line VD, the first via GK1, the second via GK2, the third via GK3, and the third overlapping region SQ3 corresponding to the same sub-pixel, the orthographic projection of the first power signal line VD on the base substrate 1000 has overlapping regions with the first via GK1, the second via GK2, and the third via GK3 respectively. The orthographic projection of the first power signal line VD on the base substrate 1000 does not overlap the fourth overlapping region SQ4.

The anode switch part YZ is electrically connected with the fifth connection part LB5 through a twelfth via GK12. The anode switch part YZ is electrically connected with an anode of a light emitting device through a fourteenth via GK14. The anode switch part YZ is electrically connected with the conductor region (for example, the second region) of the active layer of the second light emitting control transistor M6 through a thirteenth via GK13. The twelfth via GK12 penetrates the interlayer insulating layer 860. The thirteenth via GK13 penetrates the third interlayer dielectric layer 850, the second gate insulating layer 840, the second interlayer dielectric layer 830, the first interlayer dielectric layer 820 and the first gate insulating layer 810. The fourteenth via GK14 penetrates a flat layer between the fifth conductive layer 500 and a layer where the anode is located.

Exemplarily, a thickness of the flat layer may be 15000 to 30000 Å. For example, the thickness of the flat layer may be 15000 Å, or 20000 Å, or 30000 Å, which is not limited here.

Exemplarily, a parasitic capacitor may include a channel capacitor and a coupling capacitance formed by overlapping of other metal layers, or the parasitic capacitor may also include a channel capacitor. The size of the compensation capacitor in the present application may consider the size of the parasitic capacitor.

Based on the same disclosed concept, an embodiment of the present disclosure also provides a display apparatus including the above pixel circuit provided by the embodiment of the present disclosure. The principle by which the display apparatus solves the problem is similar to that of the afore-mentioned pixel circuit, and therefore the implementation of the display apparatus may be referred to the implementation of the afore-mentioned pixel circuit, which will not be repeated here.

In some embodiments, in the embodiment of the present disclosure, the display apparatus may be any product or component with a display function, such as a mobile phone, a tablet computer, a television, a display, a notebook computer, a digital photo frame, and a navigator. Other essential components of the display apparatus will be apparent to those of ordinary skill in the art and are not described in detail herein, nor should they be construed as limiting the present disclosure.

Although the preferred embodiments of the present disclosure have been described, additional variations and modifications may be made to these embodiments by those skilled in the art once the basic inventive concept is known. Therefore, it is intended that the appended claims be interpreted as including the preferred embodiments and all alterations and modifications that fall within the scope of the present disclosure.

It will be apparent to those skilled in the art that various modifications and variations can be made in the disclosed embodiments without departing from the spirit or scope of the disclosed embodiments. Thus, it is intended that the present disclosure cover the modifications and variations of the disclosure provided they come within the scope of the appended claims and their equivalents.

What is claimed is:

1. A pixel circuit, comprising:

a data writing transistor, wherein a gate of the data writing transistor is electrically connected with a first scan line, a first electrode of the data writing transistor is electrically connected with a data line, a second electrode of the data writing transistor is electrically connected with a first electrode of a drive transistor; wherein a material of an active layer of the data writing transistor is a low temperature poly-silicon material;

a compensation circuit, electrically connected with the gate of the drive transistor; and a light emitting control circuit, electrically connected with a first power signal line, the first electrode and the second electrode of the drive transistor and a first electrode of a light emitting device, and configured to turn on the first power signal line and the first electrode of the drive transistor and turn on the second electrode of the drive transistor and the first electrode of the light emitting device under control of a signal of a light emitting control line to drive the light emitting device to emit light;

wherein an orthographic projection of the compensation circuit on a base substrate partially overlaps with an orthographic projection of the first power signal line on the base substrate.

2. The pixel circuit according to claim 1, wherein the compensation circuit comprises: a first electrode and a second electrode;

the first electrode of the compensation circuit is multiplexed with a compensation conductive part, and the second electrode of the compensation circuit is multiplexed with the first scan line;

the compensation conductive part is arranged on a side of the first scan line facing away from the base substrate, and the compensation conductive part is insulated from the first scanning line; and an orthographic projection of the first scan line on the base substrate partially overlaps with an orthographic projection of the compensation conductive part on the base substrate.

3. The pixel circuit according to claim 2, wherein the orthographic projection of the first scan line on the base substrate covers the orthographic projection of the compensation conductive part on the base substrate.

4. The pixel circuit according to claim 2, wherein the light emitting control circuit comprises a storage capacitor;

the compensation conductive part is arranged on a same conductive layer as a first electrode of the storage capacitor.

5. The pixel circuit according to claim 2, further comprising:

a first connection part, arranged on a side of the compensation conductive part facing away from the base substrate; and at least one interlayer dielectric layer, arranged between the first connection part and the compensation conductive part.

6. The pixel circuit according to claim 5, wherein the orthographic projection of the compensation conductive part on the base substrate does not overlap with an orthographic projection of the gate of the drive transistor on the base substrate; and the first connection part connects the compensation conductive part and the gate of the driving transistor through at least two via holes that run through the interlayer dielectric layer.

7. The pixel circuit according to claim 5, further comprising: a threshold compensation transistor;

wherein an active layer of the threshold compensation transistor is arranged between the first connection part and a layer where the compensation conductive part is located;

at least one interlayer dielectric layer is arranged between the active layer of the threshold compensation transistor and the first connection part;

at least one interlayer dielectric layer is arranged between the active layer of the threshold compensation transistor and the layer where the compensation conductive part is located;

an orthographic projection of the active layer of the threshold compensation transistor on the base substrate does not overlap with an orthographic projection of the compensation conductive part on the base substrate; and the first connection part is connected with the compensation conductive part and the conductive region of the active layer of the threshold compensation transistor through at least two via holes that run through the interlayer dielectric layer.

8. The pixel circuit according to claim 5, wherein the first power signal line is arranged on a side of the first connection part facing away the base substrate;

an interlayer insulating layer is arranged between the first power signal line and the first connection part; and the first power signal line and the data line are arranged on a same layer.

9. The pixel circuit according to claim 8, wherein an orthographic projection of the first power signal line on the base substrate covers an orthographic projection of an active layer of a metal oxide transistor in the pixel circuit on the base substrate.

10. The pixel circuit according to claim 8, wherein a shape of an orthographic projection of the first power signal line on the base substrate is approximately β shape.

11. A display panel, comprising:

a base substrate, comprising a plurality of sub-pixels, wherein each of the plurality of sub-pixels comprise a pixel circuit, and the pixel circuit comprises a first compensation capacitor, a drive transistor and a light emitting control circuit;

a first conductive layer, arranged on the base substrate, and comprising a first scan line and a gate of the drive transistor; wherein one row of sub-pixels corresponds to one first scan line;

a first interlayer dielectric layer, arranged on a side of the first conductive layer facing away from the base substrate; and a second conductive layer, arranged on a side of the first interlayer dielectric layer facing away from the base substrate; wherein the second conductive layer comprises compensation conductive parts; wherein the plurality of sub-pixels comprise the compensation conductive parts; for a same sub-pixel, a compensation conductive part is electrically connected with the gate of the drive transistor;

an interlayer insulating layer, arranged on a side of the second conductive layer facing away from the base substrate; and a fifth conductive layer, arranged on a side of the interlayer insulating layer facing away from the base substrate, wherein the fifth conductive layer comprises a first power signal line, the first power signal line is connected with the light emitting control circuit;

wherein an orthographic projection of the first compensation capacitor partially overlaps with an orthographic projection of the first power signal line on the base substrate.

12. The display panel according to claim 11, wherein the pixel circuit further comprises: a first reset transistor and a threshold compensation transistor;

wherein the display panel further comprises: a second interlayer dielectric layer, arranged on a side of the second conductive layer facing away from the base substrate; and an oxide semiconductor layer, arranged on a side of the second interlayer dielectric layer facing away from the base substrate;

wherein the oxide semiconductor layer comprises an active layer of the first reset transistor and an active layer of the threshold compensation transistor.

13. The display panel according to claim 12, wherein, for a same sub-pixel, the active layer of the first reset transistor and the active layer of the threshold compensation transistor are integrated in a structure.

14. The display panel according to claim 12, wherein an extension direction of a channel region of the active layer of the first reset transistor is roughly the same as an extension direction of a channel region of the active layer of the threshold compensation transistor.

15. The display panel according to claim 12, wherein, for a same sub-pixel, an orthographic projection of a channel region of the threshold compensation transistor on the base substrate is closer to an orthographic projection of a channel region of the drive transistor on the base substrate than an orthographic projection of a channel region of the first reset transistor on the base substrate.

16. The display panel according to claim 12, wherein the orthographic projection of the first power signal line on the base substrate covers an orthographic projection of the oxide semiconductor layer on the base substrate.

17. The display panel according to claim 12, further comprising:

a second gate insulating layer, arranged on a side of the oxide semiconductor layer facing away from the base substrate; and a third conductive layer, arranged on a side of the second gate insulating layer facing away from the base substrate;

wherein the third conductive layer comprises a first reset line, and the first reset line is connected with a gate of the first reset transistor;

the second conductive layer further comprises: an auxiliary reset line;

for the first reset transistor and the auxiliary reset line corresponding to a same sub-pixel, an orthographic projection of the auxiliary reset line on the base substrate and an orthographic projection of an active layer of the first reset transistor on the base substrate have an overlapping region;

for the first reset transistor and the first reset line corresponding to a same sub-pixel, an orthographic projection of the first reset line on the base substrate and an orthographic projection of a channel region of the active layer of the first reset transistor on the base substrate have an overlapping region.

18. The display panel according to claim 17, wherein the auxiliary reset line and the first reset line are electrically connected on an edge of a display area of the display panel.

19. The display panel according to claim 17, wherein the third conductive layer further comprises a second scan line, and the second scan line is electrically connected with a gate of the threshold compensation transistor;

for the first scan line, the second scan line, and the first reset line corresponding to a same sub-pixel, an orthographic projection of the first scan line on the base substrate is arranged between an orthographic projections of the second scan line on the base substrate and an orthographic projections of the first reset line on the base substrate.

20. A display apparatus, comprising the display panel according to claim 11.

* * * * *